United States Patent
Araki et al.

(10) Patent No.: US 6,476,151 B1
(45) Date of Patent: Nov. 5, 2002

(54) HEAT-RESISTANT MATERIAL AND COATING MATERIAL FOR OA EQUIPMENTS HAVING FLEXIBILITY

(75) Inventors: Takayuki Araki, Settsu (JP); Yoshito Tanaka, Settsu (JP); Masahiro Kumegawa, Settsu (JP); Norihito Otsuki, Settsu (JP); Masami Kato, Settsu (JP); Tetsuo Shimizu, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/582,417

(22) PCT Filed: Dec. 22, 1998

(86) PCT No.: PCT/JP98/05790

§ 371 (c)(1),
(2), (4) Date: Aug. 11, 2000

(87) PCT Pub. No.: WO99/33891

PCT Pub. Date: Jul. 8, 1999

(30) Foreign Application Priority Data

Dec. 26, 1997 (JP) .............................................. 9-360214
Nov. 2, 1998 (JP) ........................................... 10-312584

(51) Int. Cl.[7] .............................................. C08F 259/00
(52) U.S. Cl. ......................................... 525/276; 526/79
(58) Field of Search .............................. 525/276; 526/79

(56) References Cited

FOREIGN PATENT DOCUMENTS

| JP | 2-15873 | 4/1990 |
|----|---------|--------|
| JP | 4-270712 | 9/1992 |
| JP | 6-220143 | 8/1994 |
| JP | 7-316246 | 12/1995 |

OTHER PUBLICATIONS

Translation of International Preliminary Examination Report for PCT/JP98/05790.
International Search Report for PCT/JP98/05790.

*Primary Examiner*—Jeffrey Mullis
(74) *Attorney, Agent, or Firm*—Sughrue Mion, PLLC

(57) ABSTRACT

It is possible to provide the heat resistant material and coating material for OA equipments which comprise a fluorine-containing multi-segment polymer having heat resistance, abrasion resistance, non-sticking property against toner and oil resistance in addition to flexibility and are used particularly on surfaces of fuser roll and belt. Those materials comprise a fluorine-containing multi-segment polymer having an elastomeric fluorine-containing polymer chain segment A and a non-elastomeric fluorine-containing polymer chain segment B, and the elastomeric fluorine-containing polymer chain segment A comprises not less than 90% by mole of perhaloolefin unit as a recurring unit and imparts flexibility to the whole polymer.

16 Claims, No Drawings

HEAT-RESISTANT MATERIAL AND COATING MATERIAL FOR OA EQUIPMENTS HAVING FLEXIBILITY

TECHNICAL FIELD

The present invention relates to a fluorine-containing multi-segment polymer which has flexibility and is used for parts of office automation equipment (OA equipments) requiring heat resistance. Further the present invention relates to a coating material prepared by using the fluorine-containing multi-segment polymer and a tube used for OA equipments.

BACKGROUND ART

Hitherto a urethane rubber, EP rubber, silicone rubber and the like have been used for rolls for printing machine and platen rolls. As a fuser roll for electrophotographic copying machine, a silicone rubber roll, a fluorine-containing rubber roll or the like is known. However in those rolls, even in case of use of a toner having releasing property, since releasing property (non-sticking property against toner) is not enough, a non-elastic roll coated with a fluorine-containing resin, an elastic roll covered with a shrinkable fluorine-containing resin tube on its surface, or the like has been proposed. Further there have been proposed an elastic roll obtained by coating a mixture of fluorine-containing rubber and fluorine-containing resin powder and then baking to form a fluorine-containing resin powder layer on the surface of roll (JP-B-1-36622), a roll obtained by coating a fluorine-containing rubber and fluorine-containing resin powder, baking and then further coating a fluorine-containing resin powder to form a fluorine-containing resin layer (JP-B-6-100876), and the like roll.

In fixing operation of electrophotographic copying machine, coating of a releasing oil, generally a silicone oil on a fuser roll is carried out to improve releasing property of the roll. In that case, in order to prevent a silicone oil from permeating inside the roll and causing swelling of the fuser roll, there have been proposed a fuser roll obtained by covering a shrinkable fluorine-containing resin tube on an elastic roll or a fuser roll provided with a silicone rubber layer, a fluorine-containing rubber layer or fluorosilicone rubber layer and a silicone rubber layer in that order on its metallic core roll as described in JP-A-1-205188.

Also in JP-A-62-285839, the present inventors proposed an elastic roll obtained by forming a layer of fibrillated polytetrafluoroethylene (PTFE), particularly stretched porous polytetrafluoroethylene impregnated and integrated with a heat resistant elastomer material on its metallic core roll.

On the other hand, in the roll for printing machine and platen roll which are produced by using a urethane rubber, EP rubber or silicone rubber, elasticity of the roll is good, but releasing property is not always said to be good. For that reason, there were problems that troubles such as adherence of toner, contamination of printed matters due to adherence of paper powder and winding of paper on a roll occur.

Particularly in case of the fuser roll for electrophotographic copying machine, a non-elastic roll coated with a fluorine-containing resin such as PTFE or PFA (copolymer of tetrafluoroethylene and perfluoro(alkyl vinyl ether)) has a defect that the roll has no elasticity, and a roll obtained by covering a surface of elastic roll with a shrinkable fluorine-containing resin tube is not always satisfactory from the viewpoint of surface elasticity since the fluorine-containing resin is hard and small in elongation. Further an elastic roll having a fluorine-containing resin powder layer on its surface (formed by powder coating of PFA, etc.) is good in elasticity and releasing property at an initial stage of its use, but since the fluorine-containing resin powder on its surface is easily peeled or separated, a life of the releasing property is short and further in application for a fuser roll in which its temperature becomes as high as 150° to 200° C., heat resistance of the roll is not enough. Particularly since the fluorine-containing rubber component is deteriorated and strength thereof is decreased, durability of the roll is lowered.

Also as described in JP-A-1-205188, with respect to the roll having a silicone rubber layer on a fluorine-containing rubber layer or fluorosilicone rubber layer, strength of the silicone rubber layer on the roll surface is insufficient. If an amount of a filler is increased to increase the strength, releasing property is lowered. Further since an adhesive strength between the silicone rubber layer and the fluorine-containing rubber layer or fluorosilicone rubber layer is not enough, there is a problem that coating of a silicone oil and fixing operations are carried out repeatedly, thereby causing cracking on the surface silicone rubber layer and peeling thereof in the worst case. Further in application for a fuser roll in which its temperature becomes as high as 150° to 200° C., the surface silicone rubber layer and the inside fluorine-containing rubber layer or fluorosilicone rubber layer are deteriorated and abraded due to lowering of strength since they have insufficient heat resistance.

Also the elastic roll disclosed in JP-A-62-285839 is very excellent in releasing property and good in affinity and anti-swelling property with a silicone oil, but is poor in elastic properties, particularly elasticity recovering ability. Further that elastic roll is poor in heat conductivity and has a problem that its surface temperature is lowered particularly at the time of copying continuously.

In recent years, in a copying machine, the tendency is toward color printing and higher copying speed, and thus a surface material for rolls of fixing part which has flexibility, heat resistance and abrasion resistance is demanded.

The present invention was completed in view of the mentioned problems.

Therefore an object of the present invention is to provide a heat resistant material for OA equipments which has a preferable flexibility and abrasion resistance and excellent releasing property, particularly to provide a heat resistant material for roll or belt of OA equipments.

Another object of the present invention is to provide a heat resistant material for OA equipments which has less swelling property with a silicone oil, etc. and has good releasing property (non-sticking property against toner), paper separating property, fixing property and color developing property and excellent heat resistance and durability and to provide a heat resistant material for roll or belt of OA equipments.

The present inventors have found that a specific fluorine-containing multi-segment polymer itself having an elastomeric fluorine-containing polymer chain segment imparting flexibility to the whole polymer and a non-elastomeric fluorine-containing polymer chain segment is suitable as a material for OA equipments which is required to have heat resistance, flexibility and non-sticking property.

The above-mentioned polymer can be used preferably as a material for rolls of OA equipments in applications for electronic type fixing and photosensitive parts. Particularly when used for a fuser roll, the polymer can impart, to the roll surface, excellent fixing property, color developing property, oil resistance, non-sticking property against toner and paper separating property and further heat resistance, durability and abrasion resistance.

DISCLOSURE OF INVENTION

The heat resistant fluorine-containing material for OA equipments of the present invention having flexibility comprises a fluorine-containing multi-segment polymer having an elastomeric fluorine-containing polymer chain segment A imparting flexibility to the whole polymer and a non-elastomeric fluorine-containing polymer chain segment B, in which the fluorine-containing multi-segment polymer is characterized in that the elastomeric fluorine-containing polymer chain segment A imparts flexibility to the whole polymer and comprises not less than 90% by mole of perhaloolefin unit as a recurring unit.

BEST MODE FOR CARRYING OUT THE INVENTION

Namely in the present invention, it is important that the fluorine-containing multi-segment polymer contains, in one molecule thereof, the elastomeric fluorine-containing polymer chain segment A (hereinafter referred to as "elastomeric segment A") and the non-elastomeric fluorine-containing polymer chain segment B (hereinafter referred to as "non-elastomeric segment B") which are bonded in blocked or grafted form.

In the present invention, for bonding the elastomeric segment A to the non-elastomeric segment B by blocking or grafting to give the fluorine-containing multi-segment polymer, various known processes can be adopted. Among them, a process for preparing a blocked fluorine-containing multi-segment polymer which is disclosed in JP-B-58-4728, etc., a process for preparing a grafted fluorine-containing multi-segment polymer which is disclosed in JP-A-62-34324, etc., and the like process can be adopted preferably.

Particularly preferred is the blocked fluorine-containing multi-segment polymer synthesized through so-called iodine transferring polymerization method which is disclosed in JP-B-58-4728 and Kobunshi Ronbunshu (Vol. 49, No. 10, 1992) from the viewpoint that a segmenting ratio (blocking ratio) is high and a uniform and regular segmented polymer can be obtained.

On the other hand, in case of a simple mixture of an elastomeric fluorine-containing polymer and non-elastomeric fluorine-containing polymer, generally mechanical properties (particularly at high temperature) becomes insufficient and lowering of abrasion resistance, flexibility and durability arises though it depends on kind, miscibility and compatibility of the respective polymers to be mixed.

On the contrary, by bonding the elastomeric segment A to the non-elastomeric segment B by blocking or grafting to give the multi-segment polymer like the present invention, heat resistance, mechanical properties (particularly at high temperature), etc. are enhanced, and also in case of use for rolls, heat resistance, durability and abrasion resistance can be improved more effectively as compared with the above-mentioned simple mixture of an elastomeric fluorine-containing polymer and non-elastomeric fluorine-containing polymer.

Further a rubber roll provided with a layer of fluorine-containing thermoplastic rubber having an elastomeric fluorine-containing polymer chain segment containing vinylidene fluoride as a main component on its outer surface has been proposed (Utility Model Publication JP-B-2-15873). Though the fluorine-containing segmented polymer is used for that roll, heat resistance and non-sticking property are not enough because the elastomeric fluorine-containing polymer chain segment does not contain a perhaloolefin unit as a main component.

The present inventors have found that in the iodine transferring polymerization method, when not less than 90% by mole of perhaloolefin units are contained as a recurring unit in the elastomeric segment A, a block copolymerization reaction with monomer for the non-elastomeric segment B advances regularly and uniformly and it is possible to largely decrease an amount of unintended products such as a molecule comprising only an elastomeric fluorine-containing polymer chain segment which is not bonded to a non-elastomeric component and a non-elastomeric fluorine-containing polymer chain segment having a low molecular weight even if a bonding occurs, and further that molded articles produced therefrom are useful as a heat resistant material for OA equipments, particularly a roll or belt for OA equipments. On the other hand, a material comprising a fluorine-containing multi-segment polymer containing unintended un-reacted elastomeric fluorine-containing polymer chain segment, etc. has adverse effect on parts for OA equipments produced therefrom, such as lowering of mechanical strength, heat resistance and abrasion resistance.

The elastomeric segment A in the fluorine-containing multi-segment polymer to be used for the heat resistant fluorine-containing material for OA equipments of the present invention imparts good flexibility to the material. Particularly in case of use for roll and belt for OA equipments, it is preferable that an elastic modulus of the whole fluorine-containing segmented polymer is not more than $7 \times 10^8$ dyn/cm$^2$ at 150° C., particularly not more than $5 \times 10^8$ dyn/cm$^2$ at 150° C., thereby giving good fixing property and color developing property even in applications for fuser rolls or belts, in which the tendency is toward high quality picture and coloring.

Examples of the usable perhaloolefin as a recurring unit of the elastomeric segment A are, for instance, tetrafluoroethylene (TFE), chlorotrifluoroethylene (CTFE), perfluorovinylethers such as perfluoro(alkyl vinyl ether) (alkyl group has 1 to 5 carbon atoms) (PAVE) and

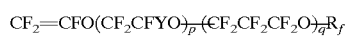

wherein Y is F or CF$_3$, R$_f$ is a perfluoroalkyl group having 1 to 5 carbon atoms, p is 0 or an integer of 1 to 5, q is 0 or an integer of 1 to 5, provided that p+q≧1, hexafluoropropylene (HFP), and the like. Among them, those having a combination and composition giving elastomeric property can be used. Further a monomer giving a curing site for peroxide crosslinking, polyol crosslinking, polyamine crosslinking and other curing reaction and a monomer having functional group for imparting adhesive property, etc. with other material may be introduced in an amount of not more than 10% by mole.

In the fluorine-containing multi-segment polymer used in the present invention, the elastomeric segment A is a segment generally being non-crystalline and having a glass transition temperature of not more than 25° C. Examples of preferred composition thereof are, for instance, 50 to 85/15 to 50/0 to 10% by mole, particularly 50 to 80/20 to 50/0 to 5% by mole of TFE/PAVE/monomer giving a curing or adhering function.

Examples of the monomer giving a curing site are, for instance, vinylidene fluoride, iodine-containing monomers represented by $CX_2=CX-R_f^3CHRI$, in which X is H, F or $CH_3$, $R_f^3$ is a linear or branched fluoro- or perfluoro-alkylene group or fluoro- or perfluoro-oxyalkylene group which may have at least one ether type oxygen atom, a fluoropolyoxyalkylene group or a perfluoropolyoxyalkylene group, R is H or $CH_3$, $CF_2=CHI$, nitrile-containing monomers represented by

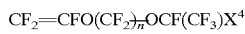

in which m is 0 or an integer of 1 to 5, n is an integer of 1 to 3,
in which n is an integer of 1 to 4, $$CF_2=CFO(CF_2)_nOCF(CF_3)X^4$$

in which n is an integer of 2 to 5,
in which n is an integer of 1 to 6, $$CF_2=CF(OCF_2CF(CF_3))_nOCF_2CF(CF_3)X^4$$

in which n is 1 or 2, or
wherein $X^4$ is CN, COOH or $COOR^1$, in which $R^1$ is an alkyl group which has 1 to 10 carbon atoms and may contain fluorine atom, bromine-containing monomers, carboxyl group-containing monomers, alkoxycarbonyl group-containing monomers, and the like. Usually iodine-containing monomers, nitrile-containing monomers and carboxyl group-containing monomers are suitable.

As the iodine-containing monomer, a perfluoro(vinyl ether) compound is suitable from the viewpoint of copolymerizability thereof. For example, perfluoro(6,6-dihydro-6-iodo-3-oxa-1-hexene) and perfluoro(5-iodo-3-oxa-1-pentene) are suitable.

In addition, there is fluorovinylether disclosed in JP-B-5-63482 and represented by the formula:

$$ICH_2CF_2CF_2(OCFY^3CF_2)_nOCF=CF_2$$

in which $y^3$ is a trifluoromethyl group, n is 0, 1 or 2.

Examples of the monomer giving good adhesion to other materials, e.g. metals such as aluminum and stainless steel and organic materials such as silicone rubber and polyimide, are a fluorine-containing or non-fluorine-containing monomer having hydroxyl group, carboxyl group, carboxylic acid derivative, sulfonic acid, sulfonic acid derivative, epoxy group, acetyl group or the like.

In order to impart enough flexibility to rolls for OA equipments, particularly a fuser roll and a soft roll of pressure roll, it is preferable that a glass transition temperature of the elastomeric segment A in the fluorine-containing multi-segment polymer of the present invention is not more than 10° C.

The elastomeric segment A can be prepared by iodine transferring polymerization method known as a process for preparing a fluorine-containing rubber (JP-B-58-4728, JP-A-62-12734).

For example, there is a method of carrying out emulsion polymerization with stirring the above-mentioned perhaloolefin and if necessary, monomer giving a curing site under pressure in water medium substantially under oxygen-free condition in the presence of an iodine compound, preferably a diiodine compound and a radical polymerization initiator.

Represented examples of diiodine compound to be used are, for instance, 1-3-diiodoperfluoropropane, 1,4-diiodoperfluorobutane, 1,3-diiodo-2-chloroperfluoropropane, 1,5-diiodo-2,4-dichloroperfluoropentane, 1,6-diiodoperfluorohexane, 1,8-diiodoperfluorooctane, 1, 12-diiodoperfluorododecane, 1,16-diiodoperfluorohexadecane, diiodomethane and 1,2-diiodoethane. Those compounds can be used alone or in a mixture thereof. Among them, 1,4-diiodoperfluorobutane is preferred. An amount of the diiodine compound is from 0.01 to 1% by weight on the basis of a total weight of the elastomeric segment A.

A radical polymerization initiator which is used for preparing the elastomeric segment A of the present invention may be the same as that which has been used for polymerization of a fluorine-containing elastomer. Examples thereof are organic and inorganic peroxides and azo-compounds. Represented examples of the initiator are persulfates, carbonate peroxides, peroxide esters, and the like. Preferred initiator is ammonium persulfate (APS). APS can be used solely or in combination with a reducing agent such as sulfites.

Though a wide range of emulsifying agents can be used for emulsion polymerization, from a point of inhibiting a chain transfer reaction with molecules of the emulsifying agent which occurs during the polymerization, carboxylic acid salts having a fluorocarbon chain or fluoropolyether chain are desirable. An amount of the emulsifying agent is desirably from about 0.05% by weight to 2% by weight, particularly desirably from 0.2 to 1.5% by weight based on added water.

Since the monomer mixture gas used in the present invention is explosive as described in Advances in Chemistry Series, G. H. Kalb et al, 129, 13 (1973), it is necessary to take measures for a polymerization equipment not to cause a sparking. From that point of view, it is preferable that a polymerization pressure is as low as possible.

The polymerization pressure can be changed in a wide range, generally in a range of from 0.5 to 5 MPa. The higher the polymerization pressure is, the more a polymerization speed increases. Therefore the polymerization pressure is desirably not less than 0.8 MPa from the viewpoint of increasing productivity.

It is preferable that a number average molecular weight of the so-obtained elastomeric segment A is from 5,000 to 750,000, particularly from 20,000 to 400,000 from the viewpoint of imparting flexibility, elasticity and mechanical properties to the whole fluorine-containing multi-segment polymer obtained.

An end of the so-obtained elastomeric segment A is of perhalo type and has an iodine atom which becomes a starting point of block copolymerization of the non-elastomeric segment B.

In the present invention, the non-elastomeric segment B is basically not limited if it has a fluorine atom and does not have the above-mentioned elastomeric property. The non-elastomeric segment B may be selected according to characteristics and functions which are intended to be obtained by block-copolymerizing the non-elastomeric segment B.

Among monomers constituting the non-elastomeric segment B, examples of a fluorine-containing monomer are, for instance, one or two or more of perhaloolefins such as TFE, CTFE, PAVE, HFP, $CF_2=CF(CF_2)_pX^3$ in which p is an integer of 1 to 10, $X^3$ is F or Cl, and perfluoro-2-butene; and partly fluorinated olefins such as vinylidene fluoride (VdF), vinyl fluoride, trifluoroethylene,

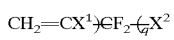

in which $X^1$ and $X^2$ are H or F, q is an integer of 1 to 10 and $CH_2=C(CF_3)_2$. Also one or two or more of monomers copolymerizable therewith, for example, ethylene, propylene, vinyl chloride, vinyl ethers, vinyl esters of carboxylic acid and acryls can be used as copolymerizable components.

Among them, examples of preferred monomer used as a main component are a single use of fluorine-containing olefin, a combination of fluorine-containing olefins, a combination of ethylene and TFE and a combination of ethylene and CTFE from the viewpoint of chemical resistance and heat resistance. Particularly a single use of perhaloolefin and a combination of perhaloolefins are preferred.

Examples thereof are (1) VdF/TFE (0 to 100/100 to 0), particularly VdF/TFE (70 to 99/30 to 1), PTFE or PVdF;
(2) ethylene/TFE/HFP (6 to 43/40 to 81/10 to 30), 3,3,3-trifluoropropylene-1,2-trifluoromethyl-3,3,3-trifluoropropylene-1/PAVE (40 to 60/60 to 40);
(3) TFE/$CF_2$=$CF$-$R_f^1$ (amount exhibiting non-elastomeric property, namely less than 15% by mole of $CF_2$=$CF$-$R_f^1$, in which $R_f^1$ is $CF_3$ or $OR_f^2$ ($R_f^2$ is a perfluoroalkyl group having 1 to 5 carbon atoms);
(4) VdF/TFE/CTFE (50 to 99/30 to 0/20 to 1);
(5) VdF/TFE/HFP (60 to 99/30 to 0/10 to 1);
(6) ethylene/TFE (30 to 60/70 to 40);
(7) polychlorotrifluoroethylene (PCTFE);
(8) ethylene/CTFE (30 to 60/70 to 40);
and the like.

When heat resistance and abrasion resistance are required in case of a material for fuser rolls and belts, it is preferable that a crystalline melting point of the non-elastomeric segment B is not less than 150° C. In case of a material for fuser rolls and belts particularly for high speed copying machine or printer, the crystalline melting point is particularly preferably not less than 250° C. Particularly from the viewpoint of good heat resistance, non-sticking property and abrasion resistance, the non-elastomeric fluorine-containing polymer chain segment having perhaloolefin as a main recurring unit is preferred.

Further it is particularly preferable that the non-elastomeric segment B in the fluorine-containing multi-segment polymer of the present invention is a polymer chain comprising more than 85% by mole a and not more than 100% by mole of tetrafluoroethylene and 0% by mole or less than 15% by mole of the formula (1) represented by:

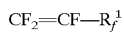

(1)

wherein $R_f^1$ is $CF_3$ or $OR_f^2$, in which $R_f^2$ is a perfluoroalkyl group having 1 to 5 carbon atoms. The resulting polymer exhibits excellent characteristics such as heat resistance, abrasion resistance and non-sticking property against toner in case of use for rolls for OA equipments and fuser rolls.

An iodine atom at a molecular end of the fluorine-containing multi-segment polymer of the present invention can be replaced with another atom or organic group by various methods.

For example, the molecular end of the fluorine-containing multi-segment polymer of the present invention consisting of perhaloolefin can be fluorinated and replaced with —$CF_3$ group by treating the polymer with fluorine gas.

Thereby non-sticking property, heat resistance, oil resistance and chemical resistance of the fluorine-containing multi-segment polymer can be enhanced more.

The treatment with fluorine gas is carried out by bringing the fluorine-containing multi-segment polymer of the present invention consisting of perhaloolefin into contact with fluorine gas usually at 50° to 250° C., preferably at a temperature up to 200° C. for 1 to 10 hours, preferably for 2 to 5 hours. A treating pressure may be from 1 to 10 kgG/cm², usually an atmospheric pressure. Fluorine gas to be used may be pure fluorine gas. From the viewpoint of safety, fluorine gas diluted with an inert gas such as nitrogen gas, helium gas or argon gas to 2 to 25% by volume, preferably 7 to 15% by volume is preferred.

When brought into contact with fluorine gas, the fluorine-containing multi-segment polymer may be in any form of powder, pellet or flake. Further it is possible to carry out the fluorination treatment after the polymer is formed into a film, tube or other molded article.

To the non-elastomeric segment B or to the structure of the fluorine-containing multi-segment polymer of the present invention, if necessary a carboxyl group or its derivative, hydroxyl group, sulfonic acid group or its derivative, epoxy group or the like can be introduced by copolymerization of a monomer having functional group or by reaction of end group of the segmented polymer, and thereby adhesion to a substrate, crosslinkability and affinity for a filler can be enhanced and various other functions can be imparted.

Block copolymerization of the non-elastomeric segment B can be carried out subsequently to the emulsion polymerization of the elastomeric segment A by changing a monomer to one for the non-elastomeric segment B.

A number average molecular weight of the non-elastomeric segment B can be adjusted in a wide range of from 1,000 to 1,200,000, preferably from 3,000 to 600,000. An important feature of the present invention is to use the fluorine-containing multi-segment polymer in which the non-elastomeric segment B can be securely block-copolymerized with the elastomeric segment A and a molecular weight (degree of polymerization) of the non-elastomeric segment B can be increased. As mentioned above, this can be achieved by making the elastomeric segment A have perhaloolefin units of not less than 90% by mole, particularly not less than 95% by mole as a recurring unit.

The thus obtained fluorine-containing multi-segment polymer mainly comprises polymer molecules (B-A-B) in which the non-elastomeric segments B are bonded to both sides of the elastomeric segment A and polymer molecules (A-B) in which the non-elastomeric segment B is bonded to one side of the elastomeric segment A. An amount of polymer molecules (C) which comprise only the elastomeric segment A without being bonded to the non-elastomeric segment B is not more than 20% by weight, preferably not more than 10% by weight based on a total amount of the segment A and polymer molecule (C) in the fluorine-containing multi-segment polymer.

If the polymer molecule (C) exists in an amount exceeding 20% by weight, mechanical properties and abrasion resistance of parts for OA equipments which are produced therefrom are lowered. Particularly in case of use for rolls and belts for OA equipments which are heated to a temperature of as high as not less than 150° C., abrasion resistance particularly at high temperature is lowered.

A proportion of the elastomeric segment A to the elastomeric segment B in the fluorine-containing multi-segment polymer is optionally selected depending on kind of member, roll or belt used for OA equipments, required characteristics, etc. and also depending on compositions of each segment. The proportion of the elastomeric segment A: the elastomeric segment B is selected preferably in the range of from 5:95 to 98:2 (% by weight). Particularly in case of use as a material for rolls at a fixing part which requires flexibility, heat resistance and abrasion resistance together, the elastomeric segment A: the elastomeric segment B is preferably 20:80 to 95:5 (% by weight), particularly preferably 30:70 to 90:10 (% by weight).

In case of use for rolls and belts for OA equipments, if the proportion of the elastomeric segment A is too small, flexibility becomes insufficient and fixing property and color developing property are lowered. Also if the proportion of the elastomeric segment B is too small, heat resistance, and mechanical properties and abrasion resistance in case of use at high temperature become insufficient, which is not preferable.

When a crosslinking point is provided by introducing a curing site in the elastomeric segment A, vulcanization (crosslinking) can be carried out by peroxide vulcanization with known organic peroxides, polyol vulcanization with known polyols, polyamine vulcanization with known polyvalent amine compounds, and the like.

In addition, the vulcanization can be carried out by triazine vulcanization, in which a triazine ring is formed with an organotin compound (for example, JP-A-58-152041), oxazole vulcanization, in which a nitrile group is introduced as a crosslinking point in a fluorine-containing elastomer and an oxazole ring is formed with bisaminophenol (for example, JP-A-59-109546), imidazole vulcanization, in which an imidazole ring is formed with a tetraamine compound (for example, JP-A-59-109546), thiazole vulcanization, in which a thiazole ring is formed with bisaminothiophenol (for example, JP-A-8-104789), and the like.

To the fluorine-containing multi-segment polymer of the present invention can be mixed various fillers depending on application and purpose.

Particularly when the fluorine-containing multi-segment polymer of the present invention is used as a material for rolls for OA equipments represented by fuser rolls for copying machine, printer, etc. and belts for OA equipments, fillers which can impart electric conductivity to the roll surface are mixed mainly.

Examples of the filler for imparting electric conductivity are carbon blacks (Ketjen Black, Acetylene Black, etc.); carbons such as PAN type carbon fiber, pitch type carbon fiber and pulverized expansive graphite; fluorinated carbons prepared by fluorinating those carbons completely or partly; metals such as Ag, Ni, Cu, brass, silver-plated copper, Zn, Al and stainless steel (in the form of powder, flake, fiber or the like); metal oxides in the form of fine particles such as $SnO_2$ (Sb dope), $In_2O_3$ (Sn dope) and ZnO (Al dope); ferrites; highly dielectric substances such as barium titanate; and the like.

An adding amount of the filler being capable of imparting electric conductivity is optionally selected depending on a desired surface resistance or volume specific resistance of rolls or belts for OA equipments and further depending on kind of an electrically conductive filler to be used. The amount of the filler is from about 0.1% by weight to about 40% by weight, preferably from 1 to 30% by weight on the basis of the whole composition comprising the fluorine-containing multi-segment polymer and filler.

Particularly a partly fluorinated carbon is preferred from the points that the resistance can be controlled stably in a narrow range of from $10^8$ to $10^{13}$ Ωcm and that electric conductivity can be given without lowering non-sticking property of the fluorine-containing polymer.

Examples of the preferred partly fluorinated carbon are those obtained by fluorinating carbon materials such as carbon black, carbon fiber, petroleum coke and graphite powder.

Among them, preferred is a fluorinated carbon black obtained by fluorinating carbon black, particularly a fluorinated carbon black having a ratio F/C of fluorine atom to carbon atom of not less than 0.1 and less than 1.0, particularly not less than 0.1 and less than 0.5.

If F/C of the fluorinated carbon black is less than 0.1, an effect of the fluorination is insufficient and problems which a carbon material before the fluorination has remain unsolved, namely a problem that a ratio of change in resistance for an adding amount is very large and controlling of electric conductivity is difficult and a problem that dispersing of fluorinated carbon becomes non-uniform due to developed structure and the obtained composition becomes hard. If F/C is not less than 1.0, a desired electric conductivity cannot be given to the composition.

In the present invention, F/C is measured as follows. A fluorinated carbon black is wrapped together with a combustion improver $Na_2O_2$ and polyethylene film in a filtrating paper and then burnt in a tightly closed flask filled with oxygen. Measurement of the generated hydrogen fluoride is made through usual method by using a fluoride ion meter (Ion Analyzer 901 available from Orion Co., Ltd.). A fluorine content is calculated from the measured value. F/C is calculated from the obtained fluorine content.

The above-mentioned fluorinated carbon black mainly comprises poly(carbon monofluoride). Preferred is a fluorinated carbon black obtained by fluorinating carbon black having an average particle size of from 0.01 to 50 μm, preferably from 0.01 to 1 μm. In case of a fluorinated carbon black obtained from a carbon material having an average particle size exceeding 50 μm, for example, petroleum coke, graphite powder or carbon fiber as a starting material, an amount thereof has to be increased for imparting electric conductivity and non-sticking property to a resin and disadvantages tend to arise, such as an increase in surface roughness of the obtained composition, lowering of mechanical strength and non-uniform resistance.

Example of the suitable carbon material for the fluorinated carbon black is a carbon black having an average particle size mentioned above. Examples of commercially available carbon black are, for instance, Furnace Black for rubber (for example, ASAHI #55 available from Asahi Carbon Co., Ltd.), Channel Black for coloring (for example, LEBEN 7000 available from Columbia Carbon Co., Ltd.), Thermal Black (SEVACARBON MT-C 1 available from Columbia Carbon Co., Ltd.), and the like.

Among carbon blacks, those generally called conductive carbon black are preferred. The conductive carbon black is defined by factors such as a smaller average particle size (average particle size: not more than 0.1 μm), a larger surface area ($N_2$ surface area: not less than 50 m²/g), a developed structure (oil absorption: not less than 100 cc/g), less impurities (ash content: less than 0.1%) and advanced graphitization. The conductive carbon black is widely used since it can impart conductivity to a material in a relatively small amount. Examples of the commercially available conductive carbon black are, for instance, Ketjen Black EC and Ketjen Black EC-600JD (Ketjen Black International Co., Ltd.), Black Pearls 2000, Vulcan XC-72 and CSX-99 (Cablack Co., Ltd.), Denka Black (Denki Kagaku Kogyo Kabushiki Kaisha), Conductex 950 (Columbia Carbon Co., Ltd.), and the like.

The fluorinated carbon black to be used in the present invention can be obtained by bringing those carbon materials into contact with fluorine gas at a temperature in the range of from 200° to 600° C., more preferably from 300° to 500° C. At a reaction temperature lower than that range, there occur problems that progressing of fluorination reaction is slow, a degree of fluorination is difficult to increase, thermal stability is not enough and characteristics of the fluorinated carbon black such as non-sticking property and lubricity are not exhibited. On the contrary, at a reaction temperature higher than that range, thermal decomposition reaction easily arises and a yield of the obtained fluorinated carbon black is decreased. Also since there is a case where a drastic thermal decomposition reaction occurs, which results in an explosion, full attention should be paid to that.

Fluorine gas to be used in the reaction may be diluted with an inert gas such as nitrogen, argon, helium or carbon tetrafluoride or may contain hydrogen fluoride. The reaction can be carried out under normal pressure, and there is no problem even if the reaction is made under reduced pressure or under pressure.

Besides the above-mentioned conditions, a reaction time, a fluorine gas flow, etc. may be optionally selected depending on a reactivity of a starting carbon material with fluorine and a desired F/C (fluorine content).

A proportion of the fluorine-containing multi-segment polymer of the present invention to the above-mentioned fluorinated carbon is optionally selected depending on a desired resistance. The proportion is from 1/99 to 20/80 (in weight ratio, hereinafter the same). If an amount of the fluorinated carbon is decreased, a sufficient effect of the addition cannot be obtained, and if its amount is too large, mechanical strength such as tensile strength tends to be lowered.

Further in order to enhance mechanical properties and compression restoration property, a filler may be mixed. Represented examples of preferred filler are those in the form of fiber such as glass fiber, carbon fiber, asbestos fiber, potassium titanate fiber and the like.

Examples of rolls for OA equipments, to which the fluorine-containing multi-segment polymer of the present invention is applied, are as follows.

Roll Example 1
(i) Metallic core roll of aluminum or stainless steel
(ii) Fluorine-containing multi-segment polymer having, as the Elastomeric segment A, one or two or more segments comprising a polymer chain having a molecular weight of 5,000 to 750,000 and obtained by copolymerizing 50 to 85% by mole of tetrafluoroethylene with 15 to 50% by mole of perfluoro(alkyl vinyl ether) and as the non-elastomeric segment, one or two or more segments comprising a polymer chain having a molecular weight of 3,000 to 1,200,000 and obtained by polymerizing more than 85% by mole and not more than 100% by mole of tetrafluoroethylene with 0% by mole or less than 15% by mole of the formula (1):

$$CF_2=CF-R_f^1 \tag{1}$$

wherein $R_f^1$ is $CF_3$ or $-OR_f^2$, in which $R_f^2$ is a perfluoroalkyl group having 1 to 5 carbon atoms.

Fuser roll or pressure roll at a fixing part which is produced by laminating the polymer (ii) as an outer layer of the substrate (i).

Roll Example 2
(i) Metallic core roll of aluminum or stainless steel
(ii) Composition prepared by mixing a filler imparting electric conductivity with the fluorine-containing multi-segment polymer described in (ii) of Roll Example 1 (outer layer)

Fuser roll or pressure roll at a fixing part which is produced by laminating the polymer (ii) as an outer layer of the substrate (i).

The fluorine-containing multi-segment polymer of the present invention itself has flexibility and therefore even if laminated directly on the metallic core roll as described in the above-mentioned Roll Examples 1 and 2, enough flexibility can be obtained. In addition, by providing an elastic layer of silicone rubber, fluorine-containing rubber, urethane rubber, EPDM or the like, the roll can be endowed with more flexibility and effectively comply with requirements for higher quality picture and paper feeding property at high speed. Among them, the elastic layers having a rubber hardness of 10 to 40 degrees or not more than 10 degrees (including a layer in the form of sponge) are selected.

Roll Example 3
(i) Metallic core roll of aluminum or stainless steel
(ii) Silicone rubber
(iii) Fluorine-containing multi-segment polymer described in (ii) of Roll Example 1 (outer layer)

Fuser roll or pressure roll at a fixing part which is produced by laminating the silicone rubber layer (ii) on the substrate (i) and thereon the polymer layer (iii) as an outermost layer.

Roll Example 4
(i) Metallic core roll of aluminum or stainless steel
(ii) Silicone rubber,
(iii) Composition prepared by mixing a filler imparting electric conductivity with the fluorine-containing multi-segment polymer described in (ii) of Roll Example 1 (outer layer)

Fuser roll or pressure roll at a fixing part which is produced by laminating the silicone rubber layer (ii) on the substrate (i) and thereon the polymer layer (iii) as an outermost layer.

Between each layer of each layered rolls of the above-mentioned Roll Examples 1 to 4, an adhesive or primer may be used to improve adhesion thereof.

Preferred are Roll Examples 3 and 4. Usually any one of the fuser roll or pressure roll of the fixing part or the both of them are provided with a heating device such as a ceramic heater to soften or melt a toner for fixing an image to a paper. The material for OA equipments of the present invention has enough heat resistance against such a heating device.

The fluorine-containing multi-segment polymer used for the material for OA equipments of the present invention is used as a molding material which can be molded into the form of sheet, film or tube and thus is applied to the roll or belt for OA equipments. In that case, known molding methods can be used. The fluorine-containing multi-segment polymer or the composition prepared by blending a filler to the fluorine-containing multi-segment polymer can be molded into necessary forms by extrusion molding, injection molding, compression molding or the like.

Further the fluorine-containing multi-segment polymer used for the material for OA equipments of the present invention can be used as a coating material when prepared into a composition containing a liquid carrier or into a powder form having a specific particle size and apparent density. The coating material can be used not only for application in OA equipments but also for a lining material, roll, belt, hose, sealing material, and the like in the fields of transportation such as automobiles, semiconductor production facilities, chemical plant, aircraft, food processing facilities, photographic and printing facilities, coating apparatuses, steel making facilities, etc. The coating material of the present invention comprises the fluorine-containing multi-segment polymer. As the fluorine-containing multi-segment polymer, those described above in the heat resistant material for OA equipments having flexibility can be preferably used similarly. The coating material is applied to the rolls and belts for OA equipments and substrates in other applications and a coating film having excellent flexibility, sealing property, heat resistance, abrasion resistance and non-sticking property can be obtained.

Further the present invention relates to the coating powder comprising the above-mentioned fluorine-containing multi-segment polymer.

For the coating powder of the present invention, the same material as the above-mentioned heat resistant material for OA equipments having flexibility can be preferably used.

The coating powder of the present invention which is used preferably is in the form of powder or particle having a particle size of from 10 to 1,000 μm and an apparent density of from 0.3 to 1.2 g/cc.

To the coating powder of the present invention can be added optionally additives, for example, a pigment such as a carbon powder, titanium oxide or cobalt oxide; a reinforcing material such as a glass fiber powder, carbon fiber powder or mica; an amine type anti-oxidant, organic sulfuric compound, organotin type anti-oxidant, phenolic anti-oxidant or a thermal stabilizer such as metal soap; a leveling agent; an anti-static agent; the same filler as mentioned above which is capable of imparting electric conductivity; and the like in the range not lowering remarkably characteristics of a fluorine-containing resin such as heat resistance.

Mixing of the fluorine-containing coating powder of the present invention with the above-mentioned additives may be carried out in the form of powder (dry type) or in the form of slurry (wet type). Preferred is the mixing in the form of powder. Examples of the usable mixing equipment are, for instance, usual mixers such as sand mill, V-type blender and ribbon type blender and pulverizing machine.

The fluorine-containing coating powder of the present invention is coated through electrostatic coating, fluid bed dipping, rotary lining or the like and then baked (preferably at a temperature of not less than a crystalline melting point thereof) to form a good coating film.

Generally it is possible to form a coating film of from 10 to 200 μm thick in case of the electrostatic powder coating and from 200 to 1,000 μm thick in case of the rotary lining.

The present invention further relates to the coating composition comprising the fluorine-containing multi-segment polymer of the present invention and a liquid medium.

For the coating composition of the present invention, the same fluorine-containing multi-segment polymers as those for the above-mentioned heat resistant material for OA equipments having flexibility can be preferably used.

The liquid carrier to be used for the coating composition of the present invention is selected from liquids which can dissolve or disperse the fluorine-containing multi-segment polymer to be used in the present invention. Examples thereof are alcohols such as methanol, ethanol, propanol and butanol and in addition, hydrocarbon type solvents such as acetone, methyl ethyl ketone, ethyl acetate, dimethylformamide, dimethylacetamide, N-methyl-2-pyrrolidone, dimethylsulfoxide, triethylphosphate, tetrahydrofuran, methyl isobutyl ketone, cyclohexanone, 1,4-dioxane, methyl cellosolve acetate, 2-nitropropane, methyl isoamyl ketone, 4-methoxy-4-methylpentanone-2 and 4-methoxy-4-methylpentanol-2; haloalkanes such as trichlorotrifluoroethane, dichlorotetrafluoroethane, dichlorodifluoroethane, chlorodifluoroethane, dichloropentafluoropropane, tetrachlorohexafluorobutane and perfluorohexane; fluorine-containing solvents such as fluorine-containing ethers, i.e. FLORINATE FC-75 (available from Three M Co., Ltd.), FLORINATE FC-77 (available from Three M Co., Ltd.) and HFE7100 (available from Three M Co., Ltd.); water; and a mixture of two or more thereof.

Also it is possible to blend usual additives such as a pigment, surfactant, anti-foaming agent, viscosity control agent and leveling agent in the range not lowering remarkably heat resistance, chemical resistance, non-sticking property and abrasion resistance.

Besides the additives, a coupling agent can be used as another component to enhance adhesive property.

The coupling agent in the present invention means a compound which acts on an interface between the organic material and the inorganic material and forms a strong bridge between the both materials through chemical or physical coupling. The coupling agent is usually a compound of silicone, titanium, zirconium, hafnium, trium, tin, aluminum or magnesium which has a group being capable of coupling the organic material and the inorganic material. Among those coupling agents, preferred are a silane coupling agent, ortho-acid esters of transition elements (for example, titanium or zirconium) of the group IV in Periodic Table and derivatives thereof, and particularly preferred is an amino silane compound.

The coating composition of the present invention can be in the form of aqueous dispersion, organic solvent dispersion, organosol or aqueous emulsion of organosol containing the fluorine-containing multi-segment polymer and if necessary, the above-mentioned additives. Among them, the form of aqueous dispersion for a coating is preferred from environmental and safety point of view. Particularly preferred is the composition in the state of the fluorine-containing multi-segment polymer being dispersed in water in the form of fine particles of from 0.01 to 1.0 μm, in which a surfactant is generally blended for stabilizing the dispersion.

The aqueous dispersion for a coating of the present invention can be prepared through various processes. Concretely there are, for example, a process for finely pulverizing a powder of fluorine-containing multi-segment polymer obtained by suspension polymerization, or the like and then dispersing the finely pulverized powder uniformly in an aqueous medium with a surfactant, a process for preparing an aqueous dispersion of fluorine-containing multi-segment polymer at the same time of polymerization by emulsion polymerization and if necessary, adding a surfactant and additives, and the like process. From the viewpoint of productivity and quality (for forming into smaller and uniform particle size), the process for preparing the aqueous dispersion directly through the emulsion polymerization is preferred.

A method of application of the coating composition of the present invention is optionally selected depending on kind of the fluorine-containing multi-segment polymer, form of a coating, purpose and application. For example, in case of the aqueous dispersion and organic solvent dispersion, usually spray coating, brush coating, roll coating and spin coating are carried out. After the coating, drying and sintering are carried out to give a coating film on a substrate. The sintering conditions are optionally selected depending on kind (composition, melting point, etc.) of the fluorine-containing multi-segment polymer. Generally the baking is carried out at a temperature of not less than a melting point of the non-elastomeric segment B in the fluorine-containing multi-segment polymer. The baking time is from five minutes to three hours, preferably from about 10 minutes to about 30 minutes while it varies depending on the sintering temperature.

The coating material of the present invention comprising the fluorine-containing multi-segment polymer is coated on a metallic core roll (aluminum and SUS) of a roll as a heat resistant material for OA equipments having flexibility or on an elastic layer of silicone rubber, fluorine-containing rubber, urethane rubber or EPDM provided on the roll, and thus a fuser roll or pressure roll having not only flexibility, heat resistance and abrasion resistance but also non-sticking property and oil resistance can be obtained.

In order to obtain the above-mentioned rolls for OA equipments by applying the coating material of the present invention, after applying, if necessary, a primer to the metallic core roll or intermediate elastic layer and then sintering depending on necessity, it is possible to coat any of the aqueous dispersion coating, solvent-soluble coating, solvent-dispersion coating or powder coating which comprises the coating material of the present invention and then bake at a temperature of not less than a melting point thereof to form a coating film. A thickness of the coating film varies depending on purpose, application and hardness of a substrate, and is selected in the range of from 1 to 500 $\mu$m, preferably from 5 to 150 $\mu$m, particularly from 5 to 100 $\mu$m. If necessary, the coating film may be ground to make its surface smooth. It is preferable to adjust a surface roughness (Ra) to not more than 1.0 $\mu$m, more preferably not more than 0.5 $\mu$m.

Further the coating material of the present invention can be used in various applications other than the application for OA equipments, by making use of its heat resistance, chemical resistance, non-sticking property, flexibility, sealing property and abrasion resistance. Examples of the application are shown in Tables 1, 2 and 3.

The tube of the present invention is a cylindrical article obtained by molding the fluorine-containing multi-segment polymer into a tubular form. The above-exemplified preferred fluorine-containing multi-segment polymers can be preferably used similarly.

A size of the tube varies depending on purpose, application and conditions in use and is not limited. Usually its inner diameter is from about 5 mm to about 50 mm and its thickness is not more than 1 mm. Particularly in case of rolls for OA equipments such as fuser rolls and pressure rolls, it is preferable that the inner diameter is from 10 to 40 mm and the thickness is from 0.01 to 0.15 $\mu$m.

The tube of the present invention is formed into a tube by usual melt-extrusion. The tube may be stretched (single screw or two screws) if necessary and may have thermal shrinkability, but usually may have neither stretchability nor thermal shrinkability.

The tube of the present invention may contain the above-mentioned filler imparting electric conductivity if necessary. The tube can be produced usually by mixing previously an electric conductivity-imparting agent by kneading or dry blending to the starting material (in the form of pellet or powder) before molding into a tube by melt-extrusion.

The molding method is also not limited particularly. Generally melt extrusion molding with a ring die is carried out as mentioned above. Namely a cylindrical film melt-extruded through a ring die with a single screw or multi-screw extruder is taken off while being cooled as it is with a proper cooling means or is taken off while adjusting its size and shape toward inside or outside by using a sizing jig after the ring die and cooling at normal temperature or with a coolant such as air or water. In that case, there is no restriction in employing such conditions as feeding of air into the cylindrical article, stretching somewhat at the time of taking off and carrying out slow cooling or rapid cooling.

The tube usually comprises one layer, and may comprise two or more layers. In such a case, it is necessary to study enough and select compatibility between polymers of each layer and a heating temperature under specific conditions mentioned below. This is because a heat treating temperature of each layer differs from each other. Molding is carried out by co-extrusion method, and there are no specific conditions like the molding of one layer.

The tube of the present invention is optionally subjected to inner surface treatment, if necessary, in order to enhance adhesion to an article to be covered with the tube. Example of the preferred inner surface treatment is chemical etching treatment, and for example, sodium-based etching agent is used preferably. In addition to the chemical etching, any of inner surface treatments may be employed as far as enhancement of adhesion can be expected. Further after the chemical etching of the inner surface, a primer may be applied to enhance adhesion to a substrate more.

The tube of the present invention is used for rolls (particularly for fuser roll and pressure roll) for OA equipments and can impart excellent flexibility and heat resistance to the rolls. In addition to those characteristics, good non-sticking property can be given by fitting the tube of the present invention on an outermost surface of the roll.

The roll provided with the tube of the present invention may be produced as mentioned above by covering its metallic core roll directly with the tube or by providing an elastic layer of silicone rubber, fluorine-containing rubber, urethane rubber or EPDM between the metallic core roll and the tube.

While the tube of the present invention can impart enough flexibility to the roll surface even if covered directly on the metallic core roll, more flexibility can be given to the roll surface by providing the elastic layer between the roll and the tube, and in case of use as a fuser roll and pressure roll for OA equipments, a higher quality picture and enhanced paper feeding property at high speed can be attained. In that case, an elastic layer having a rubber hardness of from about 10 degrees to about 30 degrees or an elastic layer having a rubber hardness of not more than 10 degrees (including a layer in the form of sponge) is preferred.

If necessary, an adhesive is used or treatment with a primer is carried out to impart adhesion between the tube of the present invention and the substrate (metallic core roll or elastic layer) contacting thereto. In that case, it is preferable to use the above-mentioned tube subjected to the inner surface treatment by etching from the point that a stronger adhesion can be obtained.

In producing the roll by providing the tube of the present invention directly on the metallic core roll, known methods can be optionally employed. It is preferable that a tube having thermal shrinkability and subjected to etching treatment of its inner surface is covered on a metallic core roll subjected to primer treatment and is shrank at a temperature of not more than a melting point (for example, at 150° to 200° C.) for setting to the substrate, followed by sintering at a temperature of not less than the melting point (for example, at 320° to 400° C.) to bond by fusion.

The roll having an elastic layer between the tube of the present invention and the metallic core roll can be produced by a method of firstly putting the metallic core roll and the tube of the present invention in a cylindrical molded article so that a space is provided between the roll and the tube and the inner surface of the cylindrical molded article comes into contact with the outer surface of the tube, and then pouring a raw rubber, latex or elastomer into the above-mentioned space, and if necessary carrying out vulcanizing. It is a matter of course that the roll covered with the tube has to be taken out of the cylindrical molded article at a necessary time. In that case, the inner surface of the tube may be subjected previously to etching treatment or primer treatment so that it is easily contacted to the rubber portion. Also the roll may be produced by previously making a rubber roll and then covering the tube of the present invention on the surface of the rubber roll. In that case, it is better to use a tube having thermal shrinkability. Thus there is no restriction in the production method of the roll.

When the roll obtained above is used as rolls for OA equipments such as a fuser roll and pressure roll, a step for making the surface of roll smooth may be carried out as case demands.

For example, a surface roughness (Ra) of the roll can be decreased by grinding the roll surface. Preferred Ra is not more than 1 μm, more preferably not more than 0.5 μm.

TABLE 1

| Fields of industry | Final product | Application | Parts |
|---|---|---|---|
| Electrical Semiconductor | Semiconductor production apparatus Liquid crystal panel production apparatus Plasma panel production apparatus | CVD device Dry etching device Wet etching device Oxidation/diffusion device Sputtering device Ashing device Cleaning device Ion implantation device | O-ring (square), packing, sealing material, tube, roll, coating, lining, gasket, diaphragm, hose |
| Transportation means Automobile | Automobile | Engine and peripheral parts | Gasket, shaft seal, valve stem seal, sealing material, hose |
| | | AT device | Hose, sealing material |
| | | Fuel line and peripheral parts | O-ring (square), tube, packing, core material of valve, hose, sealing material, diaphragm |
| Aircraft | Aircraft | Fuel line | Diaphragm, O-ring (square), valve, tube, packing, hose, sealing material |
| Rocket | Rocket | Fuel line | same as above |
| Ship | Ship | Fuel line | same as above |
| Chemical Chemicals | Plant | Processes for producing chemicals such as pharmaceutical, agricultural chemical, paint and resin, (Petroleum) | Lining, valve, packing, roll, hose, diaphragm, O-ring (square), tube, sealing material |
| Pharmaceutical | Medicines | Plug for chemicals | Plug for chemicals |
| Machinery | Developer | Film developing machine | Roll |
| Photograph | | X-ray film developing machine | Roll |
| Printing | Printing machine | Printing roll | Roll |
| Painting | Painting facilities | Coating roll | Roll |
| Physical and chemical appliances for analysis | | | Tube |
| Foods Plant | | Foods processing process | Lining, valve, packing, roll, hose, diaphragm, O-ring (square), tube, sealing material |
| Metal Steel making | Steel plate processing facilities | Steel plate processing roll | Roll |

TABLE 2

| Field of industry | Needed characteristics |
|---|---|
| Electrical | Plasma resistance, acid resistance, alkali resistance, amine resistance, ozone resistance, gas resistance, chemical resistance, cleanliness, heat resistance |
| Transportation means | Heat resistance, amine resistance |
| | Heat resistance, amine resistance |
| | Fuel resistance, fuel permeability, heat resistance |
| | Fuel resistance, fuel permeability, heat resistance |
| | Fuel resistance, fuel permeability, heat resistance |
| | Fuel resistance, fuel permeability, heat resistance |
| Chemical | Chemical resistance, solvent resistance, heat resistance |
| | Chemical resistance, solvent resistance, heat resistance |
| | Cleanliness |
| Machinery | Chemical resistance |
| | Chemical resistance |
| | Solvent resistance |
| | Solvent resistance |
| Foods | Chemical resistance, solvent resistance, heat resistance |
| Metal | Heat resistance, acid resistance |

TABLE 3

| Field of industry | Parts |
|---|---|
| Electrical | O-ring and sealing material for gate valve of corresponding product O-ring and sealing material for quartz window of corresponding product O-ring and sealing material for chamber of corresponding product O-ring and sealing material for gate of |

TABLE 3-continued

| Field of industry | Parts |
|---|---|
| | corresponding product |
| | O-ring and sealing material for bell jar of corresponding product |
| | O-ring and sealing material for coupling of corresponding product |
| | O-ring and sealing material for pump of corresponding product |
| | O-ring and sealing material for gas control device for semiconductor of corresponding product |
| | O-ring and sealing material for resist developing solution and peeling solution |
| | O-ring and sealing material for wafer cleaning solution |
| | Diaphragm for pump of corresponding product |
| | Hose for resist developing solution and peeling solution |
| | Hose and tube for wafer cleaning solution |
| | Roll for transferring wafer |
| | Lining and coating for resist developing solution tank and peeling solution tank |
| | Lining and coating for wafer cleaning solution tank |
| | Lining and coating for wet etching tank |
| Transportation means | Engine head gasket |
| | Metal gasket |
| | Crank shaft seal |
| | Cam shaft seal |
| | Valve stem seal |
| | Manifold packing |
| | Oil hose |
| | ATF hose |
| | Injector O-ring |
| | Injector packing |
| | O-ring and diaphragm for fuel pump |
| | Fuel hose |
| Chemical Machinery | Developing roll |
| | Developing roll |
| | Gravure roll |
| | Guide roll |
| | Gravure roll for coating line in production of magnetic tape |
| | Guide roll for coating line in production of magnetic tape |
| | Various coating rolls |
| Foods | |
| Metal | |

The present invention is then explained based on examples but is not limited to those examples.

PREPARATION EXAMPLE 1
(Synthesis of Elastomeric Segment A)

A 47-liter stainless steel autoclave having no ignition source was charged with 30 liters of pure water, 300 g of $C_7F_{15}COONH_4$ as an emulsifying agent and 300 g of disodium hydrogenphosphate $12H_2O$ as a pH control agent, and after replacing the inside of a system with nitrogen gas sufficiently, the autoclave was heated up to 50° C. with stirring at 200 rpm and a gas mixture of TFE and perfluoro (methyl vinyl ether) (PMVE) (32/68 in mole ratio) was introduced so that the inside pressure became 8.0 kgf/cm$^2$G. Then 100 ml of an aqueous solution of ammonium persulfate (APS) having a concentration of 55.8 mg/ml was fed with pressurized nitrogen to initiate a reaction.

At the time when the inside pressure lowered down to 7.0 kgf/cm$^2$G with advance of polymerization, 27.24 g of diiodine compound $I(CF_2)_4I$ and 234 g of aqueous solution of 10% by weight of $C_7F_{15}COONH_4$ were introduced with pressurized nitrogen. Then 60 g of TFE was fed with self-pressure thereof and 58 g of PMVE was fed under pressure with a plunger pump (TFE/PMVE=63/37 in mole ratio) so that the pressure became 8.0 kgf/cm$^2$G. Thereafter TFE and PMVE were fed in the same manner under pressure with advance of the reaction, and thus increasing and lowering of the pressure were repeated between 7 kgf/cm$^2$G and 8 kgf/cm$^2$G.

Twelve hours after starting of the polymerization reaction, when a total charging amount of TFE and PMVE reached 6,000 g, the autoclave was cooled and un-reacted monomer was released to give an aqueous dispersion having a solid content of 18.04% by weight.

A part of the aqueous dispersion was sampled, frozen, coagulated and thawed, followed by washing a coagulated product with water and then vacuum-drying to give a rubber-like polymer. A Mooney viscosity $ML_{1+10}$ (100° C.) of the polymer was 94. An intrinsic viscosity "η" was 0.654 (dl/g, 35° C., FC-75 (available from Three-M Co., Ltd.)).

As a result of $^{19}$F-NMR analysis, monomer components of the polymer were TFE/PMVE=60/40% by mole, and Tg (center value) measured according to DSC analysis was 2° C.

PREPARATION EXAMPLE 2
(Synthesis of Elastomeric Segment A)

A 47-liter stainless steel autoclave having no ignition source was charged with 30 liters of pure water, 300 g of $C_7F_{15}COONH_4$ as an emulsifying agent and 300 g of disodium hydrogenphosphate-$12H_2O$ as a pH control agent, and after replacing the inside of a system with nitrogen gas sufficiently, the autoclave was heated up to 50° C. with stirring at 200 rpm and a gas mixture of TFE/PMVE (32/68 in mole ratio) was introduced so that the inside pressure became 8.0 kgf/cm$^2$G. Then 100 ml of an aqueous solution of ammonium persulfate (APS) having a concentration of 27.9 mg/ml was fed with pressurized nitrogen to initiate a reaction.

At the time when the inside pressure lowered down to 7.0 kgf/cm$^2$G with advance of polymerization, 13.62 g of diiodine compound $I(CF_2)_4I$ and 117 g of aqueous solution of 10% by weight of $C_7F_{15}COONH_4$ were introduced with pressurized nitrogen. Then 60 g of TFE was fed with self-pressure thereof and 58 g of PMVE was fed under pressure with a plunger pump (TFE/PMVE=63/37 in mole ratio) so that the pressure became 8.0 kgf/cm$^2$G. Thereafter TFE and PMVE were fed in the same manner under pressure with advance of the reaction, and thus increasing and lowering of the pressure were repeated between 7 kgf/cm$^2$G and 8 kgf/cm$^2$G.

Sixteen hours after starting of the polymerization reaction, when a total charging amount of TFE and PMVE reached 6,000 g, the autoclave was cooled and un-reacted monomer was released to give an aqueous dispersion having a solid content of 18.16% by weight.

A part of the aqueous dispersion was sampled, frozen, coagulated and thawed, followed by washing a coagulated product with water and then vacuum-drying to give a rubber-like polymer. A Mooney viscosity $ML_{1+10}$ (100° C.) of the polymer could not be measured because the polymer did not melt. An intrinsic viscosity "η" was 1.387 (dl/g, 35° C., FC-75 (available from Sumitomo Three-M Co., Ltd.)).

As a result of $^{19}$F-NMR analysis, monomer components of the polymer were TFE/PMVE=60/40% by mole, and Tg (center value) measured according to DSC analysis was 2° C.

PREPARATION EXAMPLE 3
(Synthesis of Elastomeric Segment A)

A 47-liter stainless steel autoclave having no ignition source was charged with 30 liters of pure water, 300 g of $C_7F_{15}COONH_4$ as an emulsifying agent and 2.7 g of disodium hydrogenphosphate-12H$_2$O as a pH control agent, and after replacing the inside of a system with nitrogen gas sufficiently, the autoclave was heated up to 50° C. with stirring at 200 rpm and a gas mixture of TFE/PMVE (32/68 in mole ratio) was introduced so that the inside pressure became 8.5 kgf/cm$^2$G. Then 100 ml of an aqueous solution of ammonium persulfate (APS) having a concentration of 87.35 mg/ml was fed with pressurized nitrogen to initiate a reaction.

At the time when the inside pressure lowered down to 7.5 kgf/cm$^2$G with advance of polymerization, 61.59 g of diiodine compound I(CF$_2$)$_4$I, 100.4 g of CF$_2$=CFOCF$_2$CF$_2$CH$_2$I and 1,392 g of aqueous solution of 10% by weight of C$_7$F$_{15}$COONH$_4$ were introduced with pressurized nitrogen. Then 60 g of TFE was fed with self-pressure thereof and 66.4 g of PMVE was fed under pressure with a plunger pump (TFE/PMVE=60/40 in mole ratio) so that the pressure became 8.5 kgf/cm$^2$G. Thereafter TFE and PMVE were fed in the same manner under pressure with advance of the reaction, and thus increasing and lowering of the pressure were repeated between 7.5 kgf/cm$^2$G and 8.5 kgf/cm$^2$G.

Sixty-nine hours after starting of the polymerization reaction, when a total charging amount of TFE and PMVE reached 14 kg, the autoclave was cooled and un-reacted monomer was released to give an aqueous dispersion having a solid content of 30% by weight.

A part of the aqueous dispersion was sampled, frozen, coagulated and thawed, followed by washing a coagulated product with water and then vacuum-drying to give a rubber-like polymer. A Mooney viscosity ML$_{1+10}$ (100° C.) of the polymer was 68.

As a result of $^{19}$F-NMR analysis, monomer components of the polymer were TFE/PMVE=60/40% by mole, and Tg (center value) measured according to DSC analysis was −4° C.

PREPARATION EXAMPLE 4
(Synthesis of Elastomeric Segment A)

A 100-liter stainless steel autoclave having no ignition source was charged with 60 liters of pure water, 600 g of C$_7$F$_{15}$COONH$_4$ as an emulsifying agent and 600 g of disodium hydrogenphosphate. 12H$_2$O as a pH control agent, and after replacing the inside of a system with nitrogen gas sufficiently, the autoclave was heated up to 50° C. with stirring at 120 rpm and a gas mixture of TFE/perfluoro (methyl vinyl ether) (PMVE) (25/75 in mole ratio) was introduced so that the inside pressure became 8.0 kgf/cm$^2$G. Then 100 ml of an aqueous solution of ammonium persulfate (APS) having a concentration of 55.8 mg/ml (APS: 5.58 g) was fed with pressurized nitrogen to initiate a reaction.

At the time when the inside pressure lowered down to 7.0 kgf/cm$^2$G with advance of polymerization, an aqueous solution prepared by emulsifying 27.3 g of diiodine compound I(CF$_2$)$_4$, with 90 g of aqueous solution of 10% by weight of C$_7$F$_{15}$COONH$_4$ was introduced with pressurized nitrogen. Then 120 g of TFE was fed with self-pressure thereof and 116 g of PMVE was fed under pressure with a plunger pump (TFE/PMVE=63/37 in mole ratio) so that the pressure became 8.0 kgf/cm$^2$G. Thereafter TFE and PMVE were fed in the same manner under pressure with advance of the reaction, and thus increasing and lowering of the pressure were repeated between 7 kgf/cm$^2$G and 8 kgf/cm$^2$G.

At the time when a total charging amount of TFE and PMVE reached 12 kg after starting of the polymerization reaction, the autoclave was cooled and un-reacted monomer was released to give 73.6 kg of an aqueous dispersion having a solid content of 16.0% by weight.

A part of the aqueous dispersion was sampled, frozen, coagulated and thawed, followed by washing a coagulated product with water and then vacuum-drying to give a rubber-like polymer. A Mooney viscosity ML$_{1+10}$ (140° C.) of the polymer was 80.

As a result of $^{19}$F-NMR analysis, monomer components of the polymer were TFE/PMVE=64/36% by mole, and Tg (center value) measured according to DSC analysis was 3° C.

EXAMPLE 1
(Block Copolymerization with Non-elastomeric Segment B)

A 3-liter stainless steel autoclave was charged with 1,096 g of the aqueous dispersion obtained in Preparation Example 1 and 4.15 g of perfluoro(propyl vinyl ether) (PPVE). After replacing the inside of a system with nitrogen gas sufficiently, the inside temperature was kept at is 80° C. With stirring at 400 rpm, tetrafluoroethylene was introduced under pressure so that the inside pressure became 8.0 kgf/cm$^2$G.

Then a solution prepared by dissolving 10 mg of ammonium persulfate in 2 ml of water was introduced with pressurized nitrogen to initiate a reaction.

Since the inside pressure lowered down with advance of polymerization reaction, at the time when it lowered to 7.0 kgf/cm$^2$G, it was again raised with a tetrafluoroethylene gas up to 8.0 kgf/cm$^2$G, and thus increasing and lowering of the pressure were repeated.

At the time when 29.6 g of tetrafluoroethylene was consumed after starting of polymerization, supplying thereof was stopped, the autoclave was cooled and un-reacted monomer was released to give 1,132 g of a semi-transparent aqueous dispersion.

A polymer content of the obtained aqueous dispersion was 19.6% by weight, and a particle size thereof measured by dynamic light scattering method was 55.3 nm.

A proportion of the non-elastomeric fluorine-containing polymer chain segment to the whole polymer which was calculated from an increase in yield of polymer, namely ((Yield of polymer obtained in post polymerization)−(Amount of polymer charged))÷(Yield of polymer obtained in post polymerization)×100 was 16.2% by weight.

The obtained aqueous dispersion was frozen and coagulated, and the precipitated polymer was washed and dried to give a white solid.

According to $^{19}$F-NMR analysis, components of the non-elastomeric fluorine-containing polymer chain segment in the obtained fluorine-containing multi-segment polymer was TFE/PPVE=99.5/0.5% by mole. Also according to DSC analysis, a glass transition temperature of the elastomeric fluorine-containing polymer chain was 2° C. and a crystalline melting point of the non-elastomeric fluorine-containing polymer chain segment was 324° C. A melt flow rate measured under conditions of preheating at 372° C. for five minutes at a load of 7 kgf/cm$^2$ by using Koka-type flow tester and nozzles of 2 mm diameter×8 mm length was 43 g/10 min.

EXAMPLE 2
(Block Copolymerization with Non-elastomeric Segment B)

A 3-liter stainless steel autoclave was charged with 993.7 g of the aqueous dispersion obtained in Preparation Example 2 and 10.3 g of perfluoro(propyl vinyl ether) (PPVE). After replacing the inside of a system with nitrogen gas sufficiently, the inside temperature was kept at 80° C. With stirring at 400 rpm, tetrafluoroethylene was introduced under pressure so that the inside pressure became 8.0 kgf/cm$^2$G.

Then a solution prepared by dissolving 10 mg of ammonium persulfate in 2 ml of water was introduced with pressurized nitrogen to initiate a reaction.

Since the inside pressure lowered down with advance of polymerization reaction, at the time when it lowered to 7.0 kgf/cm$^2$G, it was again raised with tetrafluoroethylene gas up to 8.0 kgf/cm$^2$G, and thus increasing and lowering of the pressure were repeated.

At the time when 57.0 g of tetrafluoroethylene was consumed after starting of polymerization, supplying thereof was stopped, the autoclave was cooled and un-reacted monomer was released to give 1,200 g of a semi-transparent aqueous dispersion.

A polymer content of the obtained aqueous dispersion was 20.0% by weight, and a particle size thereof measured by dynamic light scattering method was 53.4 nm.

A proportion of the non-elastomeric fluorine-containing polymer chain segment to the whole polymer which was calculated from an increase in yield of polymer, namely ((Yield of polymer obtained in post polymerization)−(Amount of polymer charged))÷(Yield of polymer obtained in post polymerization)×100 was 24.8% by weight.

The obtained aqueous dispersion was frozen and coagulated, and the precipitated polymer was washed and dried to give a white solid.

According to $^{19}$F-NMR analysis, components of the non-elastomeric fluorine-containing polymer chain segment in the obtained fluorine-containing multi-segment polymer was TFE/PPVE=98.9/1.1% by mole. Also according to DSC analysis, a glass transition temperature of the elastomeric fluorine-containing polymer chain was 2° C. and a crystalline melting point of the non-elastomeric fluorine-containing polymer chain segment was 310° C. A melt flow rate was 8 g/10 min (at 372° C., at a load of 5kgf/cm$^2$).

EXAMPLE 3

(Block Copolymerization with Non-elastomeric Segment B)

A 3-liter stainless steel autoclave was charged with 694 g of the aqueous dispersion obtained in Preparation Example 1, 368 g of pure water and 17.5 g of perfluoro(propyl vinyl ether) (PPVE). After replacing the inside of a system with nitrogen gas sufficiently, the inside temperature was kept at 80° C. With stirring at 400 rpm, tetrafluoroethylene was introduced under pressure so that the inside pressure became 8.0 kgf/cm$^2$G.

Then a solution prepared by dissolving 10 mg of ammonium persulfate in 2 ml of water was introduced with pressurized nitrogen to initiate a reaction.

Since the inside pressure lowered down with advance of polymerization reaction, at the time when it lowered to 7.0 kgf/cm$^2$G, it was again raised with tetrafluoroethylene gas up to 8.0 kgf/cm$^2$G, and thus increasing and lowering of the pressure were repeated.

At the time when 125 g of tetrafluoroethylene was consumed after starting of polymerization, supplying thereof was stopped, the autoclave was cooled and un-reacted monomer was released to give 1,205 g of a semi-transparent aqueous dispersion.

A polymer content of the obtained aqueous dispersion was 21.3% by weight, and a particle size thereof measured by dynamic light scattering method was 68.8 nm.

A proportion of the non-elastomeric fluorine-containing polymer chain segment to the whole polymer which was calculated from an increase in yield of polymer, namely ((Yield of polymer obtained in post polymerization)−(Amount of polymer charged))÷(Yield of polymer obtained in post polymerization)×100 was 51.7% by weight.

The obtained aqueous dispersion was frozen and coagulated, and the precipitated polymer was washed and dried to give a white solid.

According to $^{19}$F-NMR analysis, components of the non-elastomeric fluorine-containing polymer chain segment in the obtained fluorine-containing multi-segment polymer was TFE/PPVE=99.0/1.0% by mole. Also according to DSC analysis, a glass transition temperature of the elastomeric fluorine-containing polymer chain was 2° C. and a crystalline melting point of the non-elastomeric fluorine-containing polymer chain segment was 314° C. A melt flow rate was 11 g/10 min (at 372° C., at a load of 5 kgf/cm$^2$).

EXAMPLE 4

(Block Copolymerization with Non-elastomeric Segment B)

A 3-liter stainless steel autoclave was charged with 349 g of the aqueous dispersion obtained in Preparation Example 1, 685 g of pure water and 26.4 g of perfluoro(propyl vinyl ether) (PPVE). After replacing the inside of a system with nitrogen gas sufficiently, the inside temperature was kept at 80° C. With stirring at 400 rpm, tetrafluoroethylene was introduced under pressure so that the inside pressure became 8.0 kgf/cm$^2$G.

Then a solution prepared by dissolving 10 mg of ammonium persulfate in 2 ml of water was introduced with pressurized nitrogen to initiate a reaction.

Since the inside pressure lowered down with advance of polymerization reaction, at the time when it lowered to 7.0 kgf/cm$^2$G, it was again raised with tetrafluoroethylene gas up to 8.0 kgf/cm$^2$G, and thus increasing and lowering of the pressure were repeated.

At the time when 189 g of tetrafluoroethylene was consumed after starting of polymerization, supplying thereof was stopped, the autoclave was cooled and un-reacted monomer was released to give 1,231 g of a semi-transparent aqueous dispersion.

A polymer content of the obtained aqueous dispersion was 20.2% by weight, and a particle size thereof measured by dynamic light scattering method was 82.3 nm.

A proportion of the non-elastomeric fluorine-containing polymer chain segment to the whole polymer which was calculated from an increase in yield of polymer, namely ((Yield of polymer obtained in post polymerization)−(Amount of polymer charged))÷(Yield of polymer obtained in post polymerization)×100 was 74.7% by weight.

The obtained aqueous dispersion was frozen and coagulated, and the precipitated polymer was washed and dried to give a white solid.

According to $^{19}$F-NMR analysis, components of the non-elastomeric fluorine-containing polymer chain segment in the obtained fluorine-containing multi-segment polymer was TFE/PPVE=97. 1/2.9% by mole. Also according to DSC analysis, a glass transition temperature of the elastomeric fluorine-containing polymer chain was 2° C. and a crystalline melting point of the non-elastomeric fluorine-containing polymer chain segment was 314° C. A melt flow rate was 11 g/10 min (at 372° C., at a load of 5 kgf/cm$^2$).

EXAMPLE 5

(Block Copolymerization with Non-elastomeric Segment B)

A 6-liter stainless steel autoclave was charged with 3,000 g of the dispersion obtained in Preparation Example 3. After replacing the inside of a system with nitrogen gas sufficiently, the inside temperature was kept at 80° C. With stirring at 600 rpm, tetrafluoroethylene was introduced under pressure so that the inside pressure became 2.0 kgf/cm$^2$G.

Then a solution prepared by dissolving 10 mg of ammonium persulfate in 2 ml of water was introduced with pressurized nitrogen to initiate a reaction.

Since the inside pressure lowered down with advance of polymerization reaction, at the time when it lowered to 1.5 kgf/cm$^2$G, it was again raised with tetrafluoroethylene gas up to 2.0 kgf/cm$^2$G, and thus increasing and lowering of the pressure were repeated.

At the time when about 10 g of tetrafluoroethylene was consumed after starting of polymerization, supplying thereof was stopped, the autoclave was cooled and un-reacted monomer was released to give 3,011 g of a semi-transparent aqueous dispersion.

A polymer content of the obtained aqueous dispersion was 31.3% by weight. A proportion of the non-elastomeric fluorine-containing polymer chain segment to the whole polymer which was calculated from an increase in yield of polymer, namely ((Yield of polymer obtained in post polymerization)−(Amount of polymer charged))÷(Yield of polymer obtained in post polymerization)×100 was 4.5% by weight.

The obtained aqueous dispersion was frozen and coagulated, and the precipitated polymer was washed and dried to give a white solid.

According to DSC analysis, a glass transition temperature of the elastomeric fluorine-containing polymer chain was −4° C. and a crystalline melting point of the non-elastomeric fluorine-containing polymer chain segment was 263° C. A Mooney viscosity ML$_{1+10}$ (140° C.) of the fluorine-containing multi-segment polymer was 101.

EXAMPLE 6
(Block Copolymerization with Non-elastomeric Segment B)

A 6-liter stainless steel autoclave was charged with 300 g of the dispersion obtained in Preparation Example 3. After replacing the inside of a system with nitrogen gas sufficiently, the inside temperature was kept at 80° C. With stirring at 600 rpm, tetrafluoroethylene was introduced under pressure so that the inside pressure became 2.0 kgf/cm$^2$G.

Then a solution prepared by dissolving 10 mg of ammonium persulfate in 2 ml of water was introduced with pressurized nitrogen to initiate a reaction.

Since the inside pressure lowered down with advance of polymerization reaction, at the time when it lowered to 1.5 kgf/cm$^2$G, it was again raised with tetrafluoroethylene gas up to 2.0 kgf/cm$^2$G, and thus increasing and lowering of the pressure were repeated.

At the time when about 120 g of tetrafluoroethylene was consumed after starting of polymerization, supplying thereof was stopped, the autoclave was cooled and un-reacted monomer was released to give 3,137 g of a semi-transparent aqueous dispersion.

A polymer content of the obtained aqueous dispersion was 19.6% by weight, and a particle size measured by dynamic light scattering method was 55.3 nm.

A proportion of the non-elastomeric fluorine-containing polymer chain segment to the whole polymer which was calculated from an increase in yield of polymer, namely ((Yield of polymer obtained in post polymerization)−(Amount of polymer charged))÷(Yield of polymer obtained in post polymerization)×100 was 18.5% by weight.

The obtained aqueous dispersion was frozen and coagulated, and the precipitated polymer was washed and dried to give a white solid.

According to DSC analysis, a glass transition temperature of the elastomeric fluorine-containing polymer chain was −4° C. and a crystalline melting point of the non-elastomeric fluorine-containing polymer chain segment was 328° C. A Mooney viscosity (140° C.) of the fluorine-containing multi-segment polymer could not be measured because the polymer did not melt.

REFERENCE EXAMPLE 1
(Synthesis of Fluorine-containing Multi-segment Polymer having an Elastomeric Fluorine-containing Polymer Chain Segment Comprising Structural Units other than Perhaloolefin)

(1) Synthesis of Elastomeric Fluorine-containing Polymer Chain Segment

A 6-liter stainless steel autoclave was charged with 3,000 g of pure water and 6 g of ammonium perfluorooctanoate. After the inside of the autoclave was replaced with pure nitrogen gas completely, a pressure inside the autoclave was increased up to 15 kg/cm$^2$G at 80° C. with stirring with a gas mixture of vinylidene fluoride/tetrafluoroethylene/hexafluoropropylene (VdF/TFE/HFP) of 69/11/20% by mole. Since lowering of a pressure occurred immediately after 4 g of 1% aqueous solution of APS was introduced under pressure, a reaction was continued while a gas mixture of VdF/TFE/HFP (50/20/30 in mole ratio) was fed under pressure to keep the pressure. At the time when 2 g of the additional gas mixture was consumed, 3.1 g of 1,4-diiodoperfluorobutane was fed under pressure. Thereafter the reaction was continued for 15 hours while feeding 2 g of 1% aqueous solution of APS under pressure every three hours. Then the temperature was lowered rapidly and gas was released to terminate the reaction. Thus a white aqueous dispersion having a solid content of 25% was obtained. A part of the dispersion was sampled, and coagulated with a line mixer having a strong shearing force. The coagulate was washed with water and dried to give a colorless transparent elastomeric polymer. According to $^{19}$F-NMR analysis, components of the copolymer were VdF/TFE/HFP=50/20/30% by mole, and according to DSC analysis, a glass transition temperature thereof was −10° C. and "η" was 0.65 (dl/g, 35° C., MEK). A Mooney viscosity ML$_{1+20}$(100° C.) was 75.

(2) (Block Copolymerization with Non-elastomeric Segment B)

A 6-liter stainless steel autoclave was charged with 3,000 g of the dispersion obtained in above (1). After the inside of a system was replaced with nitrogen gas sufficiently, a temperature inside the system was maintained at 80° C. With stirring at 200 rpm, tetrafluoroethylene was fed under pressure so that the inside pressure became 1.0 kgf/cm$^2$G.

Then a solution prepared by dissolving 10 mg of ammonium persulfate in 2 ml of water was introduced with pressurized nitrogen to initiate a reaction.

Since the inside pressure lowered down with advance of polymerization reaction, at the time when it lowered to 0 kgf/cm$^2$G, it was again raised with tetrafluoroethylene gas up to 1.0 kgf/cm$^2$G, and thus increasing and lowering of the pressure were repeated.

At the time when about 40 g of tetrafluoroethylene was consumed after starting of polymerization, supplying thereof was stopped, the autoclave was cooled and un-reacted monomer was released to give 3,061 g of a semi-transparent aqueous dispersion.

A polymer content of the obtained aqueous dispersion was 25.5%, and a proportion of the non-elastomeric fluorine-containing polymer chain segment to the whole polymer which was calculated from an increase in yield of polymer, namely ((Yield of polymer obtained in post polymerization)−(Amount of polymer charged))÷(Yield of polymer obtained in post polymerization)×100 was 4.5% by weight.

The obtained aqueous dispersion was frozen and coagulated, and the precipitated polymer was washed and dried to give a white solid.

According to DSC analysis, a glass transition temperature of the elastomeric fluorine-containing polymer chain segment was −4° C. and a crystalline melting point of the non-elastomeric fluorine-containing polymer chain segment was 305° C. A Mooney viscosity ML$_{1+20}$(100° C.) of the fluorine-containing multi-segment polymer was 89 and ML$_{1+10}$ (140° C.) thereof was 41.

REFERENCE EXAMPLE 2
(Blend of Elastomeric Fluorine-containing Polymer Chain Segment A and Non-elastomeric Fluorine-containing Polymer Chain Segment B)

13.5 G (15% by weight) of a copolymer (NEOFLON PFA AP-201 available from DAIKIN INDUSTRIES, LTD.) of tetrafluoroethylene and perfluoro(propyl vinyl ether) was put in a Brabender mixer of 60 cm$^3$ which was set at 350° C. After melting at 10 rpm for three minutes, 73.5 g (85% by weight) of a polymer consisting of the elastomeric fluorine-containing polymer chain segment obtained in Preparation Example 1 was added and kneading was carried out at 30 rpm for five minutes to give a composition.

REFERENCE EXAMPLE 3
(Blend of Elastomeric Fluorine-containing Polymer Chain Segment A and Non-elastomeric Fluorine-containing Polymer Chain Segment B)

A composition was prepared by kneading in the same manner as in Reference Example 2 except that 22.5 g (25% by weight) of the copolymer (same as in Reference Example 2) of tetrafluoroethylene and perfluoro(propyl vinyl ether) and 67.5 g (75% by weight) of the polymer consisting of the elastomeric fluorine-containing polymer chain segment obtained in Preparation Example 1 were used.

REFERENCE EXAMPLE 4
(Blend of Elastomeric Fluorine-containing Polymer Chain Segment A and Non-elastomeric Fluorine-containing Polymer Chain Segment B)

A composition was prepared by kneading in the same manner as in Reference Example 2 except that 42.5 g (50% by weight) of the copolymer (same as in Reference Example 2) of tetrafluoroethylene and perfluoro(propyl vinyl ether) and 42.5 g (50% by weight) of the polymer consisting of the elastomeric fluorine-containing polymer chain segment obtained in Preparation Example 1 were used.

REFERENCE EXAMPLE 5
(Blend of Elastomeric Fluorine-containing Polymer Chain Segment A and Non-elastomeric Fluorine-containing Polymer Chain Segment B)

A composition was prepared by kneading in the same manner as in Reference Example 2 except that 60.0 g (75% by weight) of the copolymer (same as in Reference Example 2) of tetrafluoroethylene and perfluoro(propyl vinyl ether) and 20.0 g (25% by weight) of the polymer consisting of the elastomeric fluorine-containing polymer chain segment obtained in Preparation Example 1 were used.

EXAMPLES 7 to 11 and COMPARATIVE EXAMPLES 1 to 2
(Measurement of Blocking Ratio)

A blocking ratio was measured by the method mentioned below with respect to the fluorine-containing multi-segment polymers obtained in Examples 1 to 4 and 6 and Reference Example 1 and the composition obtained in Reference Example 2. The results are shown in Table 4.

(Measurement of Blocking Ratio)

The blocking ratio represents a ratio indicating what percentage of the elastomeric fluorine-containing polymer which is a starting material is blocked (or segmented) in a process for preparing a fluorine-containing multi-segment polymer by post-polymerizing a polymer obtained in the first step (synthesis of elastomeric fluorine-containing polymer). The blocking ratio was measured by the following method.

The obtained fluorine-containing multi-segment polymers were put in FLORINATE (registered trademark) FC-75 (available from Sumitomo Three M Co., Ltd.) in an amount of D g, respectively (polymers of Examples 1, 2 and 4) and in acetone in an amount of 5% by weight (polymer of Reference Example 1), followed by sealing and allowing to stand at 60° C. for 24 hours.

Since polymer molecules consisting of the elastomeric fluorine-containing polymer chain segment which had not been blocked were eluted, the solution and insoluble substance were separated and the solution was taken and dried at 120° C. for one hour. Then a concentration of the polymer elution in the solution was measured and an amount (C) of eluted polymer (consisting of an elastomeric fluorine-containing polymer) was determined. Thus a blocking ratio was calculated by the following equation.

TABLE 4

$$\text{Blocking ratio (\%)}: \frac{\text{Blocked elastomeric fluorine-containing polymer}}{\text{Elastomeric fluorine-containing polymer used for post polymerization}} = \left(1 - \frac{(C)}{(D) \times (\text{Theoretical}) \text{ content of elastomeric fluorine-containing polymer}}\right) \times 100$$

| | Ex. 7 | Ex. 8 | Ex. 9 | Ex. 10 | Ex. 11 | Com. Ex. 1 | Com. Ex. 2 |
|---|---|---|---|---|---|---|---|
| Sample used | Ex. 1 | Ex. 2 | Ex. 3 | Ex. 4 | Ex. 6 | Ref. Ex. 1 | Ref. Ex. 2 |
| Elastomer components | TFE/PMVE | TFE/PMVE | TFE/PMVE | TFE/PMVE | TFE/PMVE | VDF/TFE/HFP | blended composition of elastomer of Preparation Example 1 and PFA (85/15) |
| Non-elastomer components | TFE/PMVE | TFE/PMVE | TFE/PMVE | TFE/PMVE | TFE | TFE | |
| Content of non-elastomer components (% by weight) | 16.2 | 24.8 | 51.7 | 74.7 | 81.5 | 4.5 | |
| Content of elastomer components (% by weight) | 83.8 | 75.2 | 48.3 | 25.3 | 18.5 | 95.5 | |

TABLE 4-continued $$\text{Blocking ratio (\%)}: \frac{\text{Blocked elastomeric fluorine-containing polymer}}{\text{Elastomeric fluorine-containing polymer used for post polymerization}} = \left(1 - \frac{(C)}{(D) \times (\text{Theoretical}) \text{ content of elastomeric fluorine-containing polymer}}\right) \times 100$$

|  | Ex. 7 | Ex. 8 | Ex. 9 | Ex. 10 | Ex. 11 | Com. Ex. 1 | Com. Ex. 2 |
|---|---|---|---|---|---|---|---|
| Blocking ratio (%) | 94 | 99 | 100 | 100 | 97 | 45.5 | 3 |

EXAMPLES 12 to 16 and COMPARATIVE EXAMPLES 3 to 7

(Measurement of Physical Properties)

The fluorine-containing multi-segment polymers and blended compositions of elastomeric segment A and non-elastomeric segment B which were obtained in Examples 1 to 4 and Reference Examples 2 to 5 and PFA (NEOFLON PFA AP230 available from DAIKIN INDUSTRIES, LTD) were put in a metal die of 100 mm diameter, respectively and set on a press machine set at 350° C. After preheating for 30 minutes, compression molding was carried out at 70 kg/cm² for one minute to give a film of about 0.5 mm thick.

With respect to the fluorine-containing multi-segment polymer obtained in Example 5, compression molding was carried out in the same manner as above except that a press machine of 160° C. was used, to give a sheet of about 2 mm thick.

The following various physical properties were measured by using the obtained molded film and sheet. The results are shown in Table 5.

(1) Hardness

Hardness A and hardness D were measured according to JIS K 6301.

(2) Tensile strength

The above-mentioned respective films and sheet were cut to a form of dumbbell described in ASTM-1467, and measurements were carried out at a cross head speed of 200 mm/min by using a TENSILON universal tester available from Orientec Corporation.

(3) Visco-elasticity The films and sheet were cut to a form of strip of about 35×5 mm and set on a visco-elasticity meter RSA-2 available from Rheometric Co., Ltd. Then a visco-elasticity was measured at a frequency of 1 Hz at each temperature.

TABLE 5

|  | Ex. 12 | Ex. 13 | Ex. 14 | Ex. 15 | Ex. 16 |
|---|---|---|---|---|---|
| Sample used | Ex. 1 | Ex. 2 | Ex. 3 | Ex. 4 | Ex. 6 |
| Non-elastomer components | TFE/PPVE | TFE/PPVE | TFE/PPVE | TFE/PPVE | TFE |
| Content of non-elastomer components (% by weight) | 16.2 | 24.8 | 51.7 | 74.7 | 4.5 |
| Hardness (A) | 66 | 77 | 82 | 89 | 64 |
| (D) | 18 | 24 | 30 | 35 | — |
| Tensile strength (kgf/cm²) | 43 | 103 | 210 | 207 | 64 |
| Tensile modulus (dyn/cm²) |  |  |  |  |  |
| 25° C. | $7.2 \times 10^7$ | $3.4 \times 10^8$ | $1.2 \times 10^9$ | $3.8 \times 10^8$ | — |
| 50° C. | $6.2 \times 10^7$ | $2.4 \times 10^8$ | $8.4 \times 10^8$ | $2.8 \times 10^8$ | — |
| 100° C. | $5.3 \times 10^7$ | $1.6 \times 10^8$ | $4.1 \times 10^8$ | $8.1 \times 10^8$ | — |
| 150° C. | $4.4 \times 10^7$ | $1.3 \times 10^8$ | $2.8 \times 10^8$ | $4.3 \times 10^8$ | — |
|  | Com. Ex. 3 | Com. Ex. 4 | Com. Ex. 5 | Com. Ex. 6 | Com. Ex. 7 |
| Sample used | Ref. Ex. 2 | Ref. Ex. 3 | Ref. Ex. 4 | Ref. Ex. 5 | — |
| Non-elastomer components | Blended composition of Preparation Example 1 and PFA (85/15) | Blended composition of Preparation Example 1 and PFA (75/25) | Blended composition of Preparation Example 1 and PFA (50/50) | Blended composition of Preparation Example 1 and PFA (25/75) | PFA |
| Content of non-elastomer components (% by weight) |  |  |  |  |  |
| Hardness (A) | 64 | 74 | 82 | 92 | — |
| (D) | 18 | 24 | 30 | 38 | 59 |
| Tensile strength (kgf/cm²) | 14 | 31 | 75 | 170 | 250 |

TABLE 5-continued

Tensile modulus
(dyn/cm$^2$)

| | | | | | |
|---|---|---|---|---|---|
| 25° C. | 8.4 × 10$^7$ | 2.1 × 10$^8$ | 1.7 × 10$^9$ | 3.9 × 10$^9$ | 5.3 × 10$^9$ |
| 50° C. | 7.1 × 10$^7$ | 1.8 × 10$^8$ | 1.2 × 10$^9$ | 3.7 × 10$^9$ | 4.6 × 10$^9$ |
| 100° C. | 2.7 × 10$^7$ | 9.1 × 10$^7$ | 3.9 × 10$^8$ | 1.0 × 10$^9$ | 1.5 × 10$^9$ |
| 150° C. | 7.8 × 10$^5$ | 4.6 × 10$^7$ | 2.0 × 10$^8$ | 5.4 × 10$^8$ | 8.1 × 10$^8$ |

EXAMPLE 17 and COMPARATIVE EXAMPLE 8

(Abrasion Resistance Test)

The fluorine-containing multi-segment polymer of Example 3 and the blend of the elastomeric segment A and non-elastomeric segment B of Reference Example 4 were compression-molded in the same manner as in Example 12 to give films of about 0.5 mm thick.

(Abrasion Resistance Test)

An abrasion loss of each film was determined at room temperature at a load of 1 kg by using an abrasion wheel CS-17 after 1,000, 2,000, 3,000 and 4,000 rotations, respectively. The results are shown in Table 6.

TABLE 6

| | Ex. 17 | Com. Ex. 8 |
|---|---|---|
| Sample used | Ex. 3 | Ref. Ex. 4 |
| Non-elastomer components | TFE/PPVE | Blended composition of Preparation Example 1 and PFA (50/50) |
| Content of non-elastomer components | 51.7 | |

TABLE 6-continued

| | Ex. 17 | Com. Ex. 8 |
|---|---|---|
| (% by weight) | | |
| Abrasion loss (mg) | | |
| 1,000 rotations | 44 | 34 |
| 2,000 rotations | 56 | 83 |
| 3,000 rotations | 66 | 122 |
| 4,000 rotations | 81 | 156 |

EXAMPLES 18 to 21 and COMPARATIVE EXAMPLES 9 to 11

(Non-sticking Property Test)

Films of about 0.5 mm thick were produced by compression molding in the same manner as in Example 12 by using the fluorine-containing multi-segment polymers of Examples 1 to 4 and Reference Example 1 and PFA (same as in Reference Example 2).

Further a film of about 0.5 mm thick was produced by compression molding by using DAIEL Thermoplastic T530 (available from DAIKIN INDUSTRIES, LTD.) in the same manner as in Example 12 except that a press machine set at 300° C. was used.

Non-sticking property test was carried out as mentioned below by using the above-mentioned seven films (water contact angle and contact angle of 31 dyne solution). The results are shown in Table 7.

(Water Contact Angle)

A water contact angle on the film surface was measured at room temperature by using a contact angle meter.

(Contact Angle of 31 Dyne Solution)

A solution (31 dyne solution) having a surface tension of 31 dyne/cm was prepared by mixing 97.5 (v/v %) of ethylene glycol and 2.5 (v/v %) of formaldehyde.

A contact angle of 31 dyne solution was measured by using a contact angle meter.

TABLE 7

| | Ex. 18 | Ex. 19 | Ex. 20 | Ex. 21 | Com. Ex. 9 | Com. Ex. 10 | Com. Ex. 11 |
|---|---|---|---|---|---|---|---|
| Sample used | Ex. 1 | Ex. 2 | Ex. 3 | Ex. 4 | Ref. Ex. 1 | — | — |
| Elastomer component | TFE/PMVE | TFE/PMVE | TFE/PMVE | TFE/PMVE | VdF/TFE/HFP | PFA | DAIEL Thermoplastic T-530 |
| Non-elastomer component | TFE/PPVE | TFE/PPVE | TFE/PPVE | TFE/PPVE | TFE | | |
| Content of non-elastomer component (% by weight) | 16.2 | 24.8 | 51.7 | 74.7 | 4.5 | | |
| Water contact angle (degree) | 106 | 110 | 114 | 110 | 85 | 110 | 89 |
| Contact angle of 31 dyne solution (degree) | 47 | 53 | 54 | 58 | 25 | 55 | 28 |

EXAMPLE 22

(Synthesis of Fluorine-containing Segmented Polymer)

A 170-liter glass-lined autoclave was charged with 68.5 kg of the aqueous dispersion obtained in Preparation Example 4 (content of polymer: 16%, about 11 kg), 16.0 kg of pure water and 990 g of perfluoro(propyl vinyl ether) (PPVE). After replacing the inside of a system with nitrogen gas sufficiently, the inside temperature was kept at 50° C. With stirring at 120 rpm, tetrafluoroethylene was introduced so that the inside pressure became 5.5 kgf/cm$^2$G.

Then a solution prepared by dissolving 1.2 g of ammonium persulfate in 100 ml of water was introduced with pressurized nitrogen to initiate a reaction.

Since the inside pressure lowered down with advance of polymerization reaction, tetrafluoroethylene was supplied continuously to maintain the inside pressure at 5.5 kgf/cm$^2$G.

After starting of polymerization, every time when 1.04 kg of tetrafluoroethylene was consumed, 57 g of PPVE was supplied under pressure with nitrogen gas. PPVE was supplied four times in total (228 g in total) in the same manner.

At the time when 5.2 kg of tetrafluoroethylene was consumed after starting of polymerization, supplying thereof was stopped, the autoclave was cooled and un-reacted monomer was released to give 90.4 kg of a semi-transparent aqueous dispersion. A polymer content of the obtained aqueous dispersion was 19.5% by weight.

A proportion of the non-elastomeric fluorine-containing polymer chain segment to the whole polymer which was calculated from an increase in yield of polymer, namely ((Yield of polymer obtained in post polymerization)−(Amount of polymer charged))÷(Yield of polymer obtained in post polymerization)×100 was 37.8% by weight.

The obtained aqueous dispersion was coagulated with nitric acid, and the precipitated polymer was washed and dried to give 16.5 kg of white solid.

According to $^{19}$F-NMR analysis, components of the non-elastomeric fluorine-containing polymer chain segment in the obtained fluorine-containing multi-segment polymer was TFE/PPVE=96.0/4.0% by mole. According to DSC analysis, a glass transition temperature of the elastomeric fluorine-containing polymer chain segment was 3° C. and a crystalline melting point of the non-elastomeric fluorine-containing polymer chain segment was 324° C. A melt flow rate measured with a Koka-type flow tester was 6 g/10 min (372° C. at a load of 5 kgf/cm$^2$).

EXAMPLE 23
(Fluorination Treatment of Fluorine-containing Multi-segment Polymer)

The white solid obtained in Example 22 was put in an electric oven maintained at 230° C., and after replacing the inside of oven with nitrogen, 20% by volume of fluorine gas (80% by volume of nitrogen) was flowed into the oven for five hours at a rate of 0.5 liter/min. After that, the inside of the oven was replaced with nitrogen gas sufficiently and then cooled to give a white solid.

EXAMPLE 24
(Measurement of Blocking Ratio, Physical Properties and Non-sticking Property)

A blocking ratio was measured in the same manner as in Example 7 by using the white solid of fluorine-containing multi-segment polymer obtained in Example 23. Also after producing a 0.5 mm thick film by compression molding in the same manner as in Example 12, a hardness and tensile strength were measured similarly by using the film, and further non-sticking property was determined in the same manner as in Example 18. The results are shown in Table 8.

TABLE 8

|  | Ex. 24 |
| --- | --- |
| Sample used | Ex. 23 |
| Content of non-elastomer component (% by weight) | 37.8 |
| Blocking ratio (%) | 99 |
| Hardness (A) | 64 |
| (D) | 18 |
| Tensile strength at break (kg/cm$^2$G) | 297 |
| Elastic modulus (kg/cm$^2$G) | 182 |
| Elongation at break (%) | 347 |
| Water contact angle (degree) | 118 |

TABLE 8-continued

|  | Ex. 24 |
| --- | --- |
| Contact angle of 31 dyne solution (degree) | 59 |

EXAMPLE 25
(Production of Tube)

The white solid of fluorine-containing multi-segment polymer obtained in Example 23 was extruded at 350° to 370° C. with an extruder to give pellets.

The obtained pellets were melt-extruded at 350° to 370° C. with an extruder having a ring die to give a tube having an outer diameter of 10 mm and a thickness of 100 μm.

EXAMPLE 26
(Production of Roll)

The roll provided with an outermost layer of fluorine-containing segmented polymer having flexibility and an intermediate layer of silicone rubber was produced by putting the tube obtained in Example 25 into a cylindrical molded article having a stainless steel substrate of 3 mm outer diameter in the center thereof so that the inner surface of the molded article was contacted to the outer surface of the tube and a space was provided between the above-mentioned substrate and the inner surface of the tube, and then pouring a silicone type liquid rubber into the space between the substrate and the inner surface of the tube, carrying out vulcanization and taking out the outside cylindrical molded article.

COMPARATIVE EXAMPLE 12
(Production of Roll Having Outermost Layer of PFA)

A tube having an outer diameter of 10 mm and a thickness of 100 μm was produced in the same manner as in Example 25 except that PFA (NEOFLON (registered trademark) PFA AP230 available from DAIKIN INDUSTRIES, LTD.) was used instead of the fluorine-containing multi-segment polymer. Then a roll having an outermost layer of PFA and an intermediate layer of silicone rubber was produced in the same manner as in Example 26.

EXAMPLE 27 and COMPARATIVE EXAMPLES 13 to 14
(Evaluation of Surface Flexibility)

A surface hardness, i.e. a hardness A of the rolls obtained in Example 26 and Comparative Example 12 was measured according to JIS K 6301 (Example 27 and Comparative Example 12)

Further a part of the fluorine-containing multi-segment polymer on the roll surface of Example 26 was peeled and a hardness of only intermediate layer of silicone rubber was measured in the same manner as above. The results are shown in Table 9.

INDUSTRIAL APPLICABILITY

According to the present invention, it is possible to provide the heat resistant material and coating material for OA equipments which comprise a fluorine-containing multi-segment polymer having heat resistance, abrasion resistance, non-sticking property against toner and oil resistance in addition to flexibility and are used particularly on surfaces of roll and belt of a fixing part.

What is claimed is:

1. A heat resistant fluorine-containing material for OA equipment which has flexibility and comprises a fluorine-containing multi-segment polymer having an elastomeric fluorine-containing polymer chain segment A and a non-elastomeric fluorine-containing polymer chain segment B; said elastomeric fluorine-containing polymer chain segment A imparts flexibility to the whole polymer and comprises not less than 90% by mole of perhaloolefin unit as a recurring unit and said non-elastomeric fluorine-containing polymer chain segment B contained in said fluorine-containing multi-segment polymer is a polymer chain having a crystalline melting point of not less than 150° C.

2. The heat resistant fluorine-containing material for OA equipment of claim 1 which has flexibility and is characterized in that an elastic modulus of said fluorine-containing multi-segment polymer is not more than $7 \times 10^8$ dyn/cm$^2$ at 150° C.

3. The heat resistant fluorine-containing material for OA equipment of claim 1 which has flexibility and is characterized in that the elastomeric fluorine-containing polymer chain segment A contained in said fluorine-containing multi-segment polymer is a polymer chain having a glass transition temperature of not more than 25° C.

4. The heat resistant fluorine-containing material for OA equipment of claim 1 which has flexibility and is characterized in that the non-elastomeric fluorine-containing polymer chain segment B contained in said fluorine-containing multi-segment polymer is a polymer chain having a crystalline melting point of not less than 250° C.

5. The heat resistant fluorine-containing material for OA equipment of claim 3 which has flexibility and is characterized in that the elastomeric fluorine-containing polymer chain segment A contained in said fluorine-containing multi-segment polymer is an elastic polymer chain comprising 50 to 85% by mole of tetrafluoroethylene and 15 to 50% by mole of perfluoro(alkyl vinyl ether).

6. The heat resistant fluorine-containing material for OA equipment of claim 1 which has flexibility and is characterized in that the non-elastomeric fluorine-containing polymer chain segment B contained in said fluorine-containing multi-segment polymer is a polymer chain comprising more than 85% by mole and not more than 100% by mole of tetrafluoroethylene and 0% by mole or less than 15% by mole of the formula (1):

$$CF_2=CF-R_f^1 \qquad (1)$$

wherein $R_f^1$ is $CF_3$ or $OR_f^2$, in which $R_f^2$ is a perfluoroalkyl group having 1 to 5 carbon atoms.

7. The heat resistant fluorine-containing material for OA equipment of claim 1 which has flexibility and is characterized in that the non-elastomeric fluorine-containing polymer chain segment B contained in said fluorine-containing multi-segment polymer is a polymer chain comprising 85 to 99.7% by mole of tetrafluoroethylene and 0.3 to 15% by mole of the formula (1):

$$CF_2=CF-R_f^1 \qquad (1)$$

wherein $R_f^1$ is $CF_3$ or $OR_f^2$, in which $R_f^2$ is a perfluoroalkyl group having 1 to 5 carbon atoms.

8. A method for applying a heat resistant and flexible fluorine-containing material to an article for electronic type fixing and photosensitive parts of OA equipment; which comprises applying on said article a material comprising a fluorine-containing multi-segment polymer having an elastomeric fluorine-containing polymer chain segment A and a non-elastomeric fluorine-containing polymer chain segment B; said elastomeric fluorine-containing polymer chain segment A imparts flexibility to the whole polymer and comprises not less than 90% by mole of perhaloolefin unit as a recurring unit and said non-elastomeric fluorine-containing polymer chain segment B contained in said fluorine-containing multi-segment polymer is a polymer chain having a crystalline melting point of not less than 150° C.

9. The method of claim 8, wherein an elastic modulus of said fluorine-containing multi-segment polymer is not more than $7 \times 10^8$ dyn/cm$^2$ at 150° C.

10. The method of claim 8, wherein said elastomeric fluorine-containing polymer chain segment A is a polymer chain having a glass transition temperature of not more than 25° C.

11. A method for coating a heat resistant and flexible fluorine-containing material to an article for electronic type fixing and photosensitive parts of OA equipment; which comprises coating on said article a material comprising a fluorine-containing multi-segment polymer having an elastomeric fluorine-containing polymer chain segment A and a non-elastomeric fluorine-containing polymer chain segment B; said elastomeric fluorine-containing polymer chain segment A imparts flexibility to the whole polymer and comprises not less than 90% by mole of perhaloolefin unit as a recurring unit and said non-elastomeric fluorine-containing polymer chain segment B contained in said fluorine-containing multi-segment polymer is a polymer chain having a crystalline melting point of not less than 150° C.

12. The method of claim 11, wherein an elastic modulus of said fluorine-containing multi-segment polymer is not more than $7 \times 10^8$ dyn/cm$^2$ at 150° C.

13. The method of claim 11, wherein said elastomeric fluorine-containing polymer chain segment A is a polymer chain having a glass transition temperature of not more than 25° C.

14. A method for making a tube suitable for OA equipment by molding a heat resistant and flexible fluorine-containing material into a tube; said material comprises a fluorine-containing multi-segment polymer having an elastomeric fluorine-containing polymer chain segment A and a non-elastomeric fluorine-containing polymer chain segment B; said elastomeric fluorine-containing polymer chain segment A imparts flexibility to the whole polymer and comprises not less than 90% by mole of perhaloolefin unit as a recurring unit and said non-elastomeric fluorine-containing polymer chain segment B contained in said fluorine-containing multi-segment polymer is a polymer chain having a crystalline melting point of not less than 150° C.

15. The method of claim 14, wherein an elastic modulus of said fluorine-containing multi-segment polymer is not more than $7 \times 10^8$ dyn/cm$^2$ at 150° C.

16. The method of claim 14, wherein said elastomeric fluorine-containing polymer chain segment A is a polymer chain having a glass transition temperature of not more than 25° C.

* * * * *